(12) United States Patent
Saito et al.

(10) Patent No.: US 7,241,126 B2
(45) Date of Patent: Jul. 10, 2007

(54) APPARATUS FOR IMPARTING PROTUSIONS AND RECESSES AND PRODUCT

(76) Inventors: Takao Saito, 2-27, Takamatsu-cho, Hyogo-ku, Kobe-shi, Hyogo (JP) 652-0874; Koji Saito, 2-27, Takamatsu-cho, Hyogo-ku, Kobe-shi, Hyogo (JP) 652-0874

( * ) Notice: Subject to any disclaimer, the term of this patent is extended or adjusted under 35 U.S.C. 154(b) by 255 days.

(21) Appl. No.: 10/415,599

(22) PCT Filed: Nov. 2, 2001

(86) PCT No.: PCT/JP01/09632

§ 371 (c)(1),
(2), (4) Date: Jun. 24, 2003

(87) PCT Pub. No.: WO02/36365

PCT Pub. Date: May 10, 2002

(65) Prior Publication Data

US 2004/0091563 A1    May 13, 2004

(30) Foreign Application Priority Data

Nov. 2, 2000  (JP)  ............... 2000-335593
Feb. 21, 2001  (JP)  ............... 2001-045814
Apr. 2, 2001  (JP)  ............... 2001-102983
Sep. 25, 2001  (JP)  ............... 2001-292455
Sep. 26, 2001  (JP)  ............... 2001-293313

(51) Int. Cl.
*B29C 43/46* (2006.01)

(52) U.S. Cl. .................. 425/194; 425/302.1; 425/363; 425/471; 72/204; 72/252.5

(58) Field of Classification Search ............... 425/194, 425/289, 302.1, 363, 471; 72/200, 204, 252.5
See application file for complete search history.

(56) References Cited

U.S. PATENT DOCUMENTS

| 133,454 | A | * | 11/1872 | Kellogg ........................ 492/1 |
| 3,312,583 | A | * | 4/1967 | Rochlis ...................... 425/373 |
| 3,541,216 | A | * | 11/1970 | Rochlis ...................... 425/373 |
| 3,718,959 | A | * | 3/1973 | Sailas ......................... 492/33 |
| 3,999,924 | A | * | 12/1976 | Tanaka ...................... 425/369 |
| 4,192,050 | A | * | 3/1980 | Appenzeller ................ 492/35 |
| 4,775,310 | A | * | 10/1988 | Fischer ...................... 425/363 |
| 5,884,374 | A | * | 3/1999 | Clune .......................... 24/446 |
| 6,099,289 | A | * | 8/2000 | Jens et al. .................. 425/363 |
| 6,163,939 | A | * | 12/2000 | Lacey et al. ................ 24/452 |
| 6,453,711 | B2 | * | 9/2002 | Rhodes et al. .............. 72/180 |

* cited by examiner

*Primary Examiner*—James P. Mackey
(74) *Attorney, Agent, or Firm*—Jordan and Hamburg LLP

(57) ABSTRACT

An apparatus imparts concaves/convexes to a sheet-like object by passing the sheet-like object between a pair of rollers facing each other. At least one of the rollers is a roller a surface of which is formed by laminating a single or a plurality of circular plates each provided with concaves/convexes at a peripheral edge thereof. An interval keeping mechanism is provided between the circular plates provided with concaves/convexes at the peripheral edges. At least one of the rollers is formed with a roller surface by laminating a single or a plurality of circular plates each having only convexes of concaves/convexes portions at a peripheral edge thereof. By the roller, convexes can be imparted to one face of front and back surfaces of a sheet-like object.

19 Claims, 20 Drawing Sheets

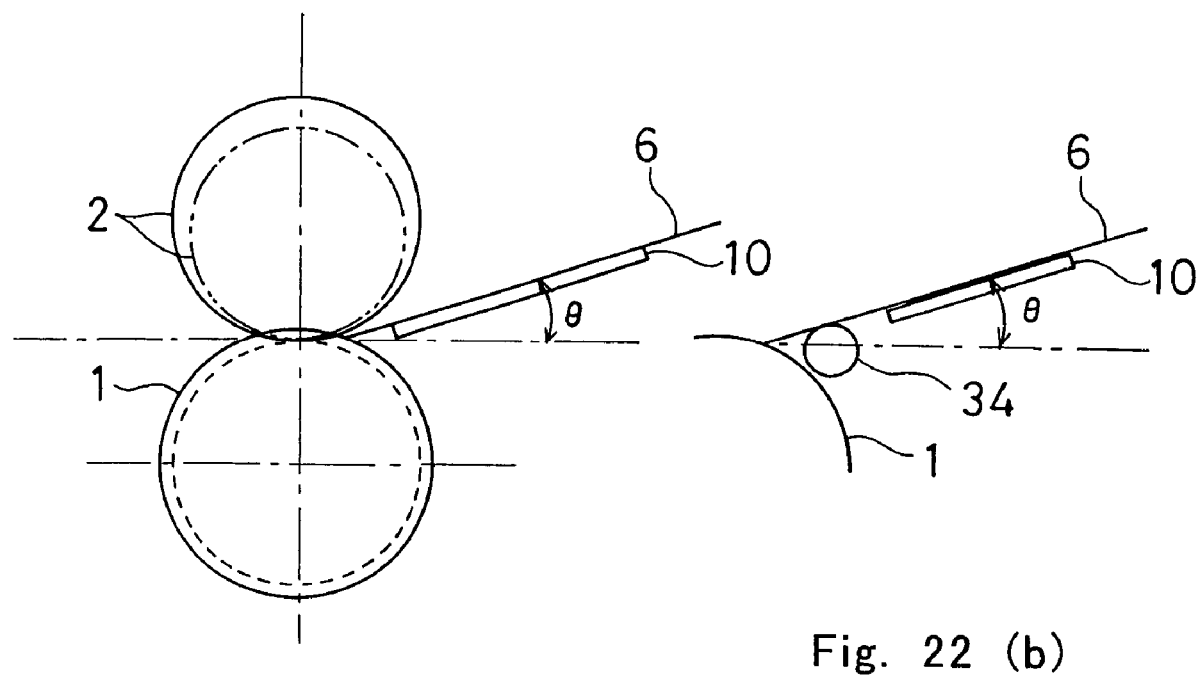
Fig. 22 (a)
Fig. 22 (b)
Fig. 23
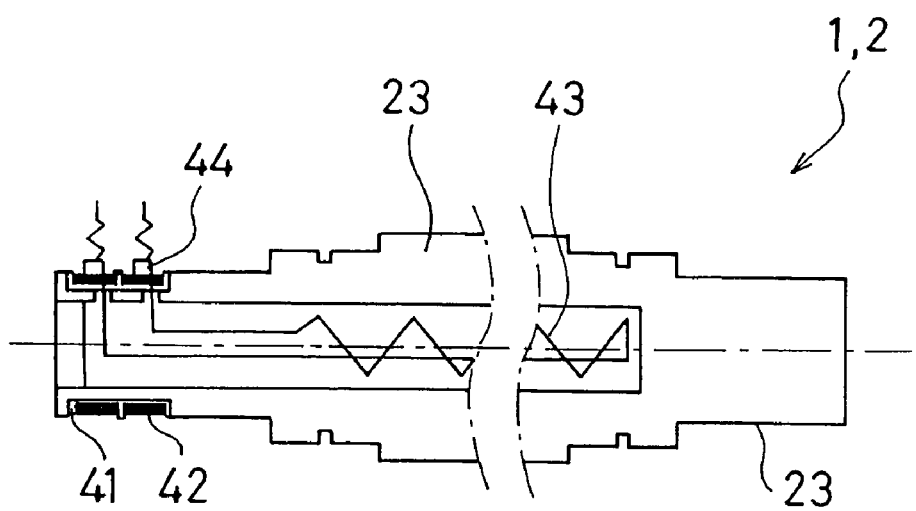

Fig. 24
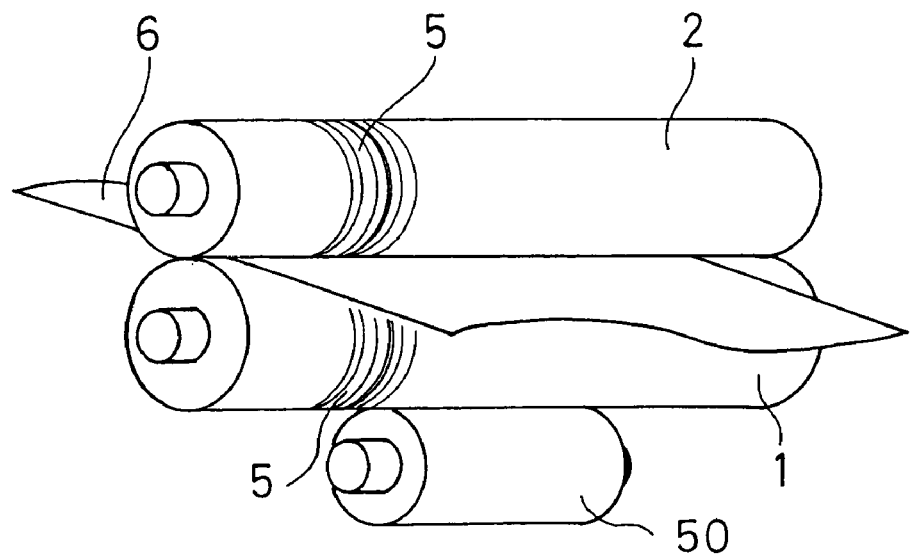
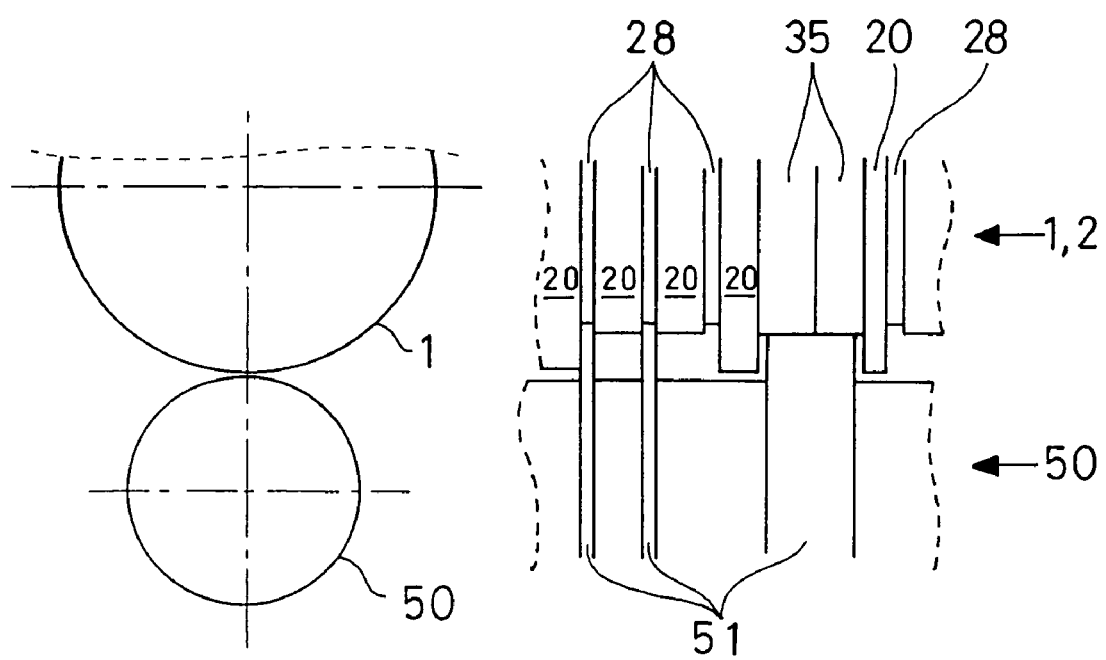
Fig. 25 (a)  Fig. 25 (b)

Fig. 29
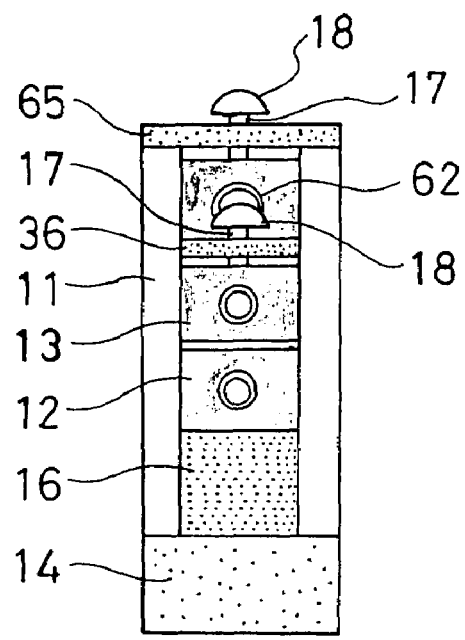
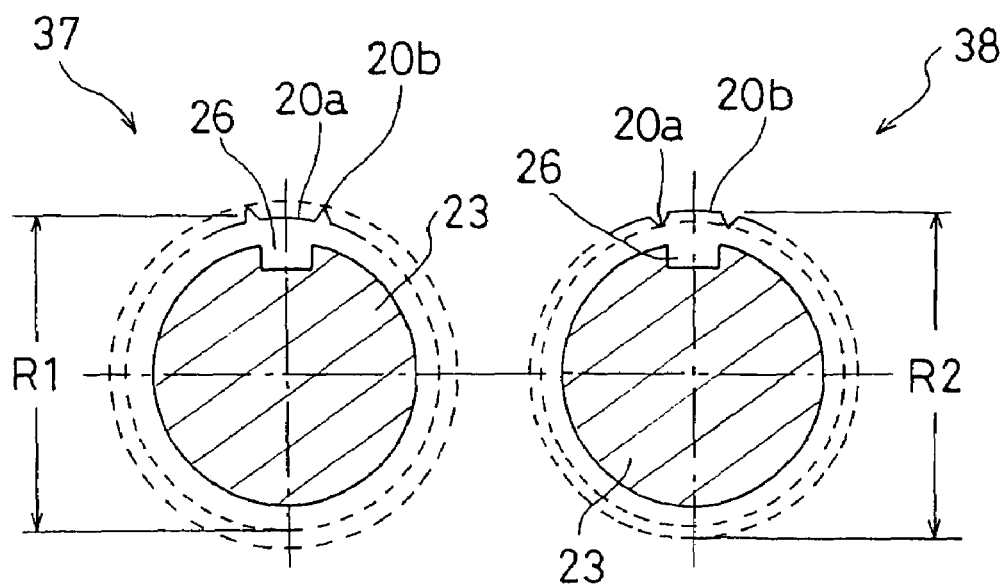
Fig. 30 (a)  Fig. 30 (b)

US 7,241,126 B2

APPARATUS FOR IMPARTING PROTUSIONS AND RECESSES AND PRODUCT

TECHNICAL FIELD

The present invention relates to an apparatus for imparting concaves/convexes for imparting concaves/convexes to a sheet-like object of a paper sheet, a synthetic resin film, a synthetic resin paper sheet, a synthetic resin plate, a thin metal plate, a food processing product or the like and a product imparted with concaves/convexes.

BACKGROUND ART

A sheet-like object imparted with concaves/convexes has been used as an ornamental material as a material excellent in ornamental performance.

Further, the sheet-like object imparted with concaves/convexes is not simply limited to the above-described use but can widely be utilized as a wiping paper sheet since a wiping effect is promoted thereby, a polishing paper sheet by utilizing convex performance of concaves/convexes, an adsorbing paper sheet of oils by utilizing adsorbing performance of concaves/convexes by utilizing a used paper sheet or a waste paper sheet, and as a packing material for a packaging material by utilizing cushioning performance of concaves/convexes.

In a background art, in imparting concaves/convexes to such a sheet-like object, concaves/convexes are imparted at respective fabricating steps, or imparted after fabricating the sheet-like object by using a pressing apparatus for imparting concaves/convexes.

In any cases, concaves/convexes are imparted by using a large-sized fabricating equipment on a maker side and there poses a problem that concaves/convexes cannot be imparted simply on a user side. The problem is particularly posed when concaves/convexes are intended to impart simply and conveniently on the user side for using a sheet-like object supplied from the maker side for a specific use for using the sheet-like object for other use. For example, although in order to effectively utilize a waste paper sheet of a newspaper paper sheet, a copy sheet or the like for wiping waste water or oil, a wiping effect is significantly promoted by imparting concaves/convexes, it is the current state that the waste paper sheet is used by being crumpled by hand since there is not a simple and convenient apparatus for imparting concaves/convexes.

Further, even when concaves/convexes are imparted to a waste material of a thick paper sheet, a thin metal sheet, a resin plate or the like for utilizing effectively as an ornamental sheet or the like, since there is not a suitable apparatus capable of imparting concaves/convexes simply and conveniently, there poses a problem that a concaves/convexes pattern is imparted by manual operation or a large scale apparatus similar to a pressing apparatus in a fabricating maker is needed.

The invention has been carried out in view of the above-described point and it is an object thereof to provide an apparatus for imparting concaves/convexes capable of imparting concaves/convexes to a sheet-like object simply and conveniently and having a simple constitution.

DISCLOSURE OF THE INVENTION

The invention is an apparatus for imparting concaves/convexes which is an apparatus for imparting concaves/convexes to a sheet-like object by passing the sheet-like object between a pair of rollers facing each other and in which at least one of the rollers is a roller a surface of which is formed by laminating a single or a plurality of circular plates each provided with concaves/convexes at a peripheral edge thereof. Further, it is preferable to provide an interval keeping mechanism between the circular plates provided with concaves/convexes at the peripheral edges. Further, it is preferable that a certain number of the interval keeping mechanisms serve also as cutting mechanisms. In addition thereto, it is preferable to provide a mechanism of preventing bending of a sheet-like object as fabricated. Further, it is preferable to provide a mechanism of heating the roller, a temperature detecting mechanism and a temperature control mechanism.

Further, it is preferable to provide a backup mechanism for backing up at least one of the rollers for imparting concaves/convexes.

Further, at least one of the rollers may be a roller formed with a roller surface by laminating a single or a plurality of circular plates each having only convexes of concaves/convexes portions at a peripheral edge thereof. By the roller, convexes can be imparted to one face of front and back surfaces of a sheet-like object.

The sheet-like object can be a thin metal plate, a metal mesh, a corrugated board, a synthetic resin plate, a nonwoven fabric, a synthetic resin film or a synthetic resin paper sheet.

BRIEF DESCRIPTION OF THE DRAWINGS

FIG. 22(a) and FIG. 22(b) are sideviews showing a bending preventive mechanism, FIG. 23 is a sectional view showing a situation of integrating a heat generating body to a roller shaft, FIG. 24 is an outline view showing a situation of using an apparatus of imparting concaves/convexes integrated with a backup roller, FIG. 25(a) is a portion of a side view showing a meshed state of a roller for imparting concaves/convexes and a backup roller, FIG. 25(b) is a portion of a front view showing the meshed state of the roller for imparting concaves/convexes and the backup roller, FIG. 29 is a side view of an example of an apparatus according to the invention integrated with a backup roller, FIG. 30(a) is a side view of a circular plate imparted with convexes, FIG. 30(b) is a side view of a circular plate imparted with concaves.

BEST MODE FOR CARRYING OUT THE INVENTION

A specific explanation will be given of examples of preferred embodiments of the invention in reference to the attached drawings as follows.

Figure 1:
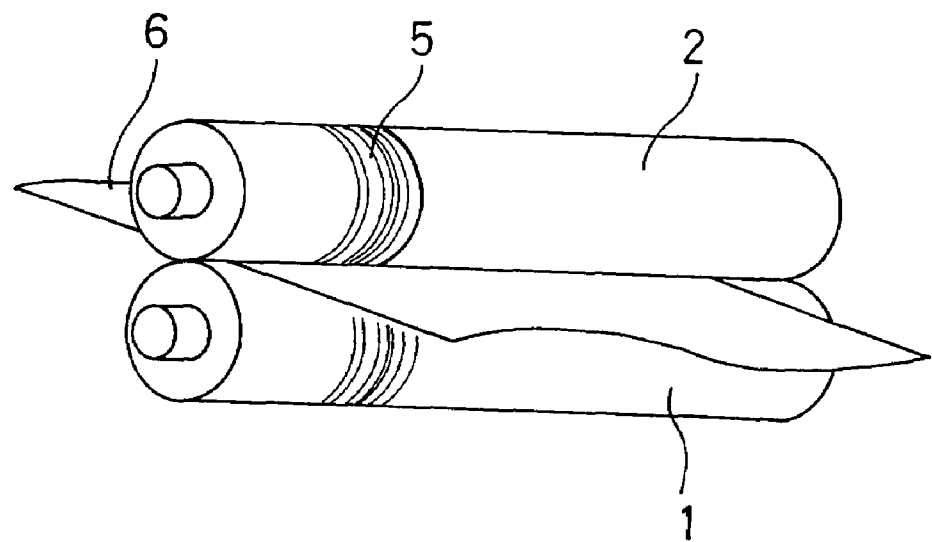
FIG. 1 is an outline view showing a situation of using an apparatus for imparting concaves/convexes.
Figure 2:
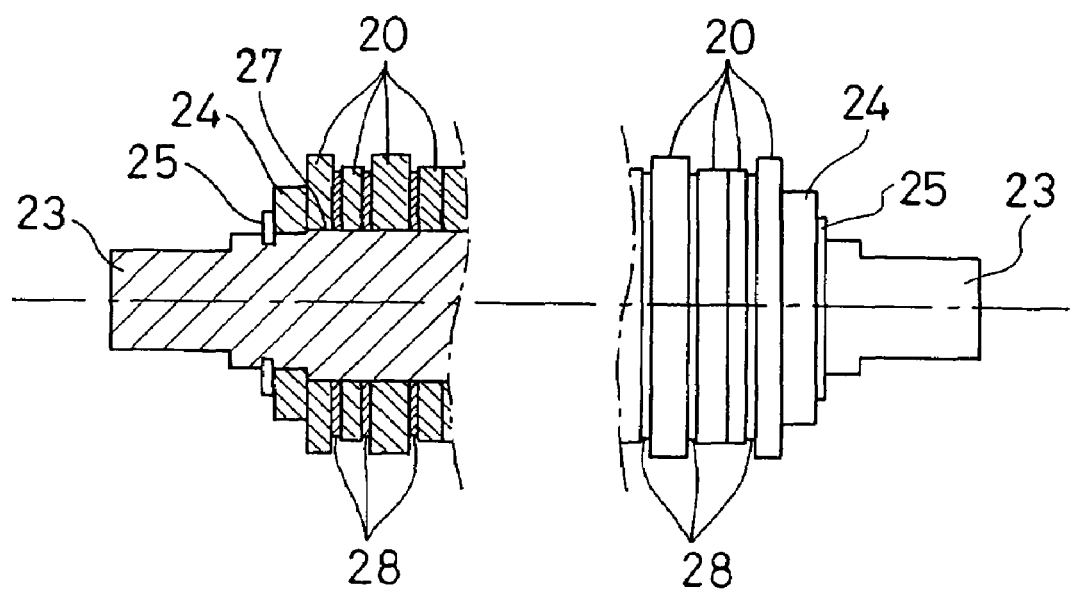
FIG. 2 is a partially sectional view of a roller.
Figure 3:
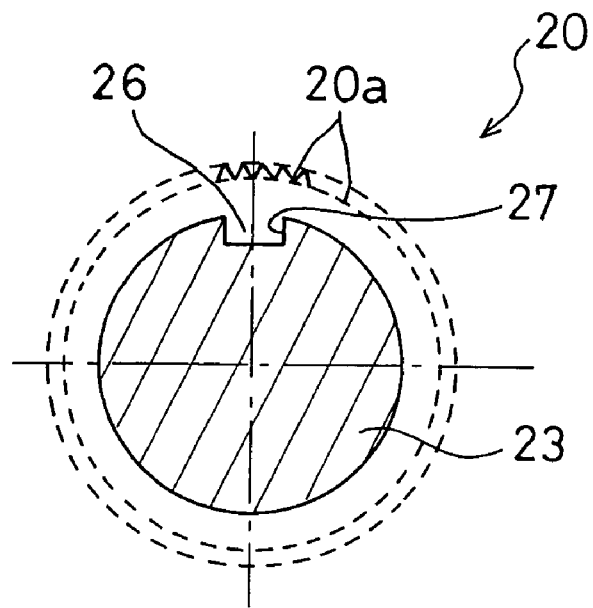
FIG. 3 is a side view of a circular plate imparted with concaves/convexes.
Figure 4:
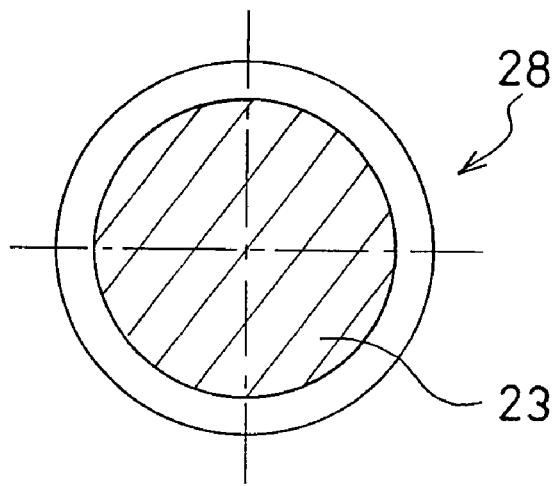
FIG. 4 is a side view of a spacer.

FIG. 1 is an outline view showing a situation of using an apparatus for imparting concaves/convexes, FIG. 2 is a partially sectional view viewing a roller 1 or 2 provided at an apparatus for imparting concaves/convexes from a front side, FIG. 3 is a side view of a circular plate imparted with concaves/convexes 20 constituting the rollers 1 and 2, and FIG. 4 is a side view of a spacer 28 which is an interval keeping mechanism constituting the rollers 1 and 2.

As shown by FIG. 1, the apparatus for imparting concaves/convexes passes a sheet-like object 6 between one roller 1 and opposed roller 2 and imparts concaves/convexes to the sheet-like object 6 by a concaves/convexes pattern 5 on a roller surface.

As shown by FIG. 2, either or both of the rollers 1 and 2 of the rollers 1 and 2 each is integrally constituted by fitting the circular plate imparted with concaves/convexes 20, the spacer 28, the circular plate imparted with concaves/convexes 20, and the spacer 28 in this order via a snap ring 25 fitted at a start end of a roller shaft 23 and a holder plate 24 and grubbing and fixing a final end thereof also by the holder plate 24 and the snap ring 25 similar to the start end. Further, when a patternless portion which is not provided with concaves/convexes is formed at a portion of a pattern of the sheet-like object 6, a circular plate which is not provided with concaves/convexes is pertinently adopted and inserted and fixed with the roller shaft 23. Further, a bolt and nut mechanism may be adopted in place of the snap ring 25.

Here, the spacer is pertinently provided as necessary and functions as a keeping mechanism for keeping an interval between a plurality of the circular plates imparted with concaves/convexes 20.

The spacers 28 and the circular plates imparted with concaves/convexes 20 may alternately be provided at sheet by sheet. Further, a single or a plurality (in other words, a number) of the circular plates imparted with concaves/convexes 20 may be provided. A group of circular plates imparted with concaves/convexes may be constituted by laminating a plurality of sheets of the circular plates imparted with concaves/convexes 20 and similarly, a single or a plurality of sheets of the spacers 28 may be laminated to use. Also a single or a plurality of sheets of the circular plates which are not provided with concaves/convexes may be laminated to use. Further, the circular plates imparted with concaves/convexes 20 having different thicknesses, the circular plates which are not provided with concaves/convexes having different thicknesses and the spacers 18 having different thicknesses can mixedly be used.

A length of a portion for fabricating concaves/convexes in a total length of the roller 1 or 2 is determined in consideration of a working width of the sheet-like object 6 to be fabricated with concaves/convexes, price of the apparatus and the like and is about 150 mm for a small apparatus for household use and about 600 mm for an apparatus for enterprise.

Further, a roller shaft diameter is determined in consideration of a length of concaves/convexes portion of the roller and a condition of the sheet-like object to be fabricated with concaves/convexes and is about 20 mm for a small apparatus for household use and about 60 mm for an apparatus for enterprise.

Naturally, the smaller or larger dimensions of the length of the concaves/convexes portion of the roller and the roller shaft diameter can also be fabricated as necessary.

Although the thickness of the circular plate 20 imparted with concaves/convexes is determined by a requested size of concaves/convexes and the thickness and the condition of the sheet-like object to be fabricated with concaves/convexes, generally, the thickness of about 1 mm through 4 mm is used. For the circular plate 20 imparted with concaves/convexes, a metal material of steel, aluminum, stainless steel, titanium, copper or the like as well as a nonmetallic material of hard resin, rubber or the like are used.

As shown by FIG. 3, the circular plate imparted with concaves/convexes 20 is a ring-like circular plate and provided with a projection 26 for constituting a key on an inner diameter side. Further, although in the drawing, only portions of concaves/convexes are shown, other portion is omitted by chain lines. A chain line on an inner side indicates a concave 20a and a chain line on an outer side indicates a convex 20b.

A key slot 27 extended in an axial direction is provided at a predetermined location of the roller shaft 23 and by fitting the projection 26 to the key slot 27, positions of concaves/convexes of the circular plate 20 imparted with concaves/convexes are fixed and not shifted. Further, a single or a plurality of the projections 26 may be provided.

Further, by pertinently designing the position of the projection 26, a pitch of concaves/convexes of the circular plate can pertinently be shifted. For example, the position of the projection 26 is pertinently designed to be able to fit one kind of the circular plates imparted with concaves/convexes alternately by changing top sides and bottom sides thereof.

By pertinently shifting the position of the projection 26 of the circular plate imparted with concaves/convexes, the position of the concave 20a can be shifted and a random pattern or a waveform type pattern can be produced.

Further, by providing a thickness of an amount of the spacer 28, mentioned later, to the circular plate 20 imparted with concaves/convexes, a circular plate imparted with concaves/convexes having a spacer function integrated with the spacer 28 and the circular plate 20 imparted with concaves/convexes may be constituted. This is useful when the circular plate is fabricated by molding by using a hard nonmetallic material.

As shown by FIG. 4, the spacer 28 is a ring-like circular plate. A thickness thereof normally falls in a range of 0.5 mm through 4.0 mm. Although a material of the spacer the same as a material of the circular plate imparted with concaves/convexes can also be adopted, when a hard nonmetallic material is used therefor, the spacer can be fabricated in light weight and inexpensively. It is preferable that an outer diameter of the spacer 28 is generally a diameter equivalent to or smaller than a diameter of forming the concave 20a of the circular plate 20 imparted with concaves/convexes when working accuracy of respective constituent parts is excellent in consideration of the thickness, the condition or the like of the sheet-like product 6.

An inner diameter thereof is determined in consideration of tolerance with a diameter of the roller shaft 23 as a reference.

Further, the outer diameter and the reference diameter of the circular plate imparted with concaves/convexes or the like and the roller shaft diameter can be made to differ between one roller and a roller opposed thereto.

Further, the spacers having different thicknesses may mixedly be used for a single roller. Therefore, in a roller adopting a plurality of circular plates imparted with concaves/convexes having the same displacement of a depth or a height of concaves/convexes and the same shape, by changing a distance between the circular plates imparted with concaves/convexes, the shape of concaves/convexes, that is, the pattern imparted to the sheet-like object 6 can be made to differ. For example, when the distance between the circular plates imparted with concaves/convexes is widened by thickening the thickness of the spacer per se or laminating a plurality of spacers having a predetermined thickness, the imparted shape of concaves/convexes becomes gradual. In this way, the pattern of concaves/convexes imparted to the sheet-like object 6 can be made to differ without fabricating and adjusting concaves/convexes of the circular plate imparted with concaves/convexes.

(Roller Attaching Structure)

Figure 5:
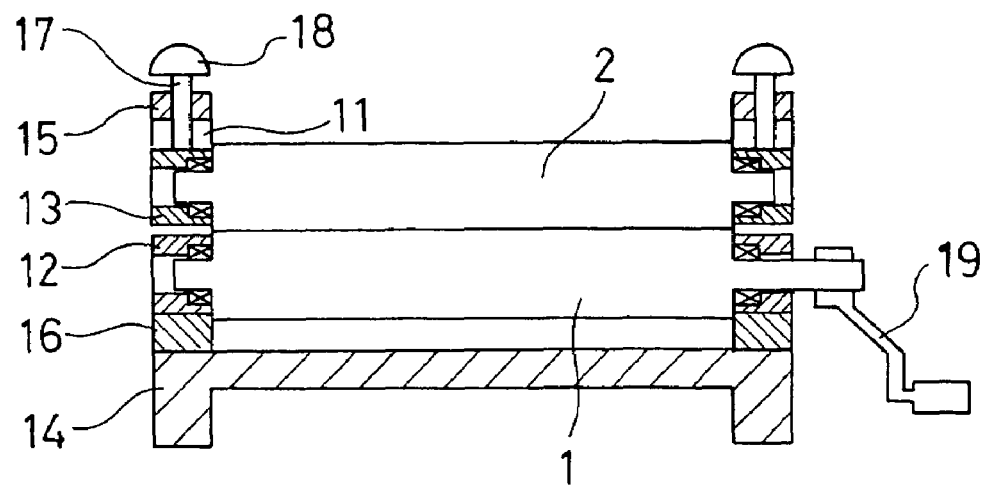
FIG. 5 is a sectional view when an example of an apparatus of the invention is viewed from a front side.
Figure 6:
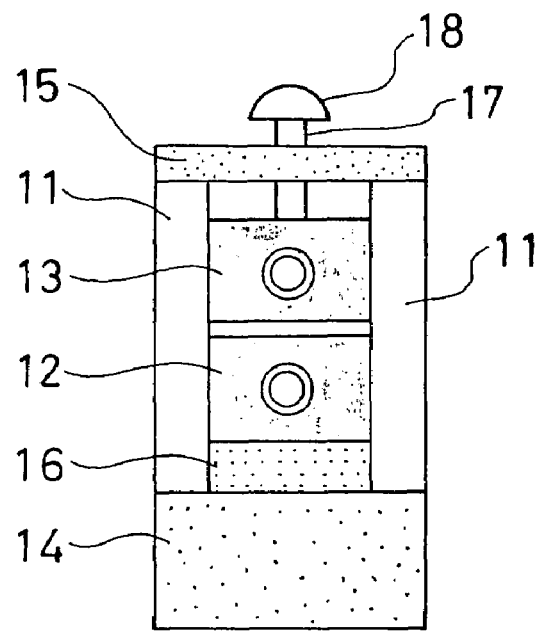
FIG. 6 is a side view of the example of the apparatus of the invention.

Next, a structure of attaching the rollers 1 and 2 having the above-described constitution will be explained in reference to FIG. 5 and FIG. 6. FIG. 5 is a sectional view when the apparatus is viewed from a front side and FIG. 6 is a side view thereof.

A base plate 14 is fixedly attached with a side wall block comprising a pair of side pillars 11 and an upper plate 15 by a pair of left and right screws or the like. A lower piece 16 is provided at inside of the side wall block and a roller bearing base 12 and an upper bearing base 13 are slidably fitted between the side pillars thereabove.

The roller 1 is attached to a left and right pair of the lower bearing bases 12 via bearings. Further, the roller 2 is attached to a left and right pair of the upper bearing bases 13 via bearings. The upper bearing base 13 is pressed downwardly by a pressing mechanism comprising a screw 17 screwed to the upper plate 15 and a clearance adjusting knob 18 to enable to adjust freely the clearance between the rollers in accordance with the thickness and the condition of the sheet-like object. Further, a helical spring can also be interposed between an upper end of the upper bearing base 13 and a lower end of the screw 17.

Further, in order to make the clearance between the upper stage roller and the lower stage roller adjustable, a push up mechanism for pushing up the upper bearing base 13 can also be provided further between the lower bearing base 12 and the upper bearing base 13. As an example of the push up mechanism, a push up mechanism is constituted by providing bolts for pushing up the upper bearing bases 13 upwardly on lower sides of both ends of the upper bearing bases 13. This is suitable for a case in which pressing by the self weight of the upper stage roller is excessively large due to the property of the sheet-like object or the like or a case in which a predetermined clearance is previously needed between the two rollers by the thickness of the sheet-like object or the like.

A manual handle 19 is attached to one end of the roller shaft 23 of the lower stage roller 1. When the manual handle 19 is turned, the roller 1 and the rollers 2 are rotated and concaves/convexes are imparted to the sheet-like object 6. When the sheet-like object 6 is thin, concaves/convexes can also be imparted only by the self weight of the upper stage roller 2. Further, the handle 19 may be provided at the upper stage roller 2. As a drive source of rotating the rollers, a power source of a motor or the like can also be used.

Further, in an apparatus for imparting concaves/convexes which particularly needs a number of small concaves/convexes, a roller surface of one roller of two rollers can also be formed by an elastic body which can respond to the convex 20b of the roller having concaves/convexes, for example, rubber or urethane and in this case, a reduction in fabrication cost can be achieved.

(Shearing Effect)

Figure 7:
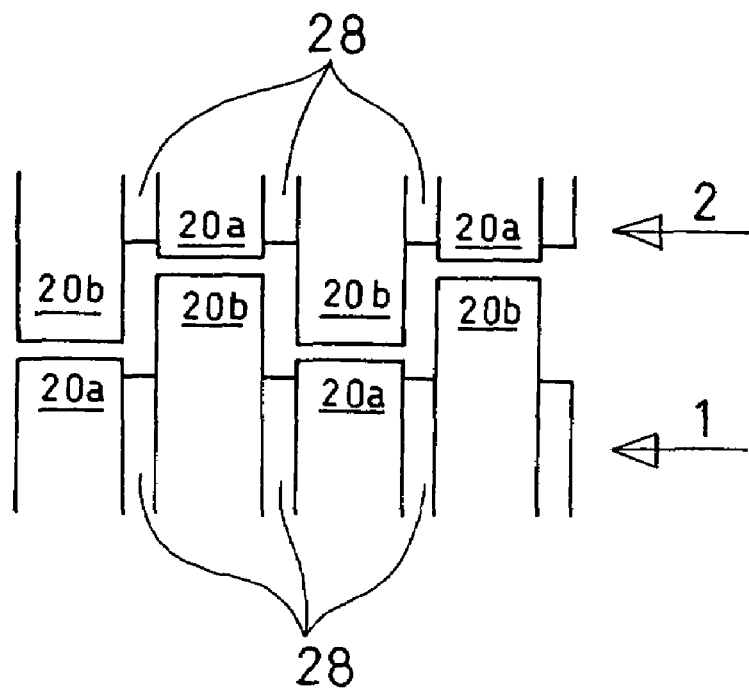
FIG. 7 is a view showing a meshed state of rollers integrated with circular plates imparted with concaves/convexes and spacers.

Further, when a shearing effect (effect of scissors) is intended to operate on the sheet-like object 6 as shown by FIG. 7, a side face of the convex 20b of the roller 1 and a side face of the convex 20b of the opposed roller 2 may be made to be contiguous to each other. In this case, it is preferable to determine the thickness of the spacer 28 in consideration of the shearing effect and the concaves/convexes shape of the circular plate 20 imparted with concaves/convexes. It is preferable that the outer diameter of the spacer is constituted by a diameter larger than a diameter of forming the concave 20a of the circular plate imparted with concaves/convexes when the shearing effect is made effective. Further, FIG. 7 is a view showing a meshed state of the two rollers 1 and 2 from a front side.

(Concaves/Convexes Shape)

Figure 8:
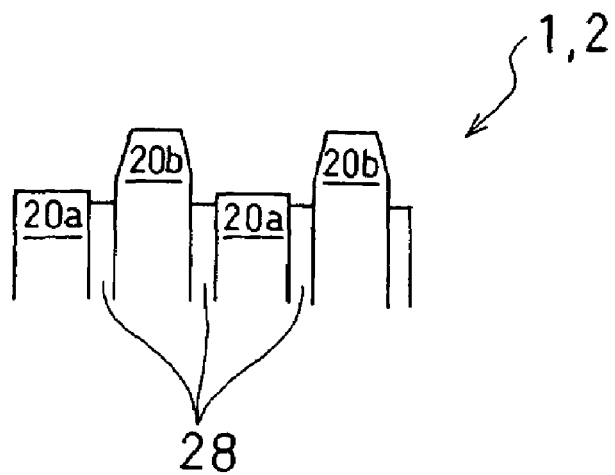
FIG. 8 is a view showing a case of tapering convexes of a circular plate imparted with concaves/convexes in a plate thickness direction.

Further, as shown by FIG. 8, the shape of the convex 20b of the circular plate imparted with concaves/convexes of either or both of the rollers 1 and 2 may be constituted by a tapered shape. In the drawing, the taper is formed by thinning the plate thickness of the convex 20b of the circular plate imparted with concaves/convexes toward a front end thereof. The taper may be the same or different between front and back sides of the circular plate imparted with concaves/convexes. By forming the taper, the two rollers can be facilitated to be brought in mesh with each other. Further, FIG. 8 is a view showing the shape of the convex 20b of the circular plate imparted with concaves/convexes of the roller 1 or 2 from a front side.

Further, FIG. 9, FIG. 10(a), FIG. 10(b), FIG. 11(a) and FIG. 11(b) show examples of the shapes of the convex 20b of the circular plate imparted with concaves/convexes adopted in the invention. Further, in order to facilitate to understand the shape of concaves/convexes of the circular plate 20 in FIG. 10(a) through FIG. 11(b), contour lines of concaves/convexes viewed from side faces of the circular plates imparted with concaves/convexes are shown on left sides of the drawings. Further, in the drawings, a dotted line designates a bottom of the concave 20a.

Figure 9:
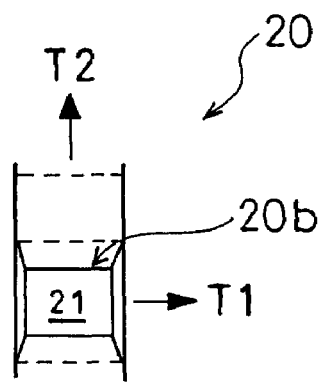
FIG. 9 is a plane view showing a basic shape (truncated quadrangular prism) of a convex of a circular plate imparted with concaves/convexes.
Figure 10:
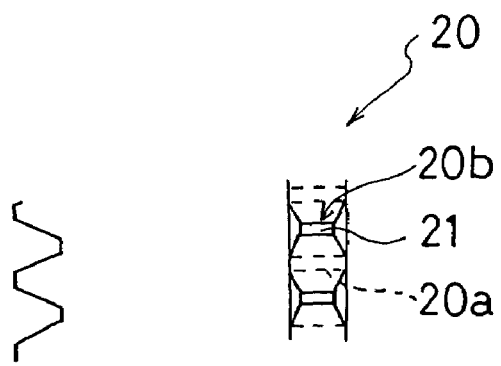
FIG. 10(a) and FIG. 10(b) are views showing a situation of a convex of a circular plate imparted with concaves/convexes increasing a working degree in a plate thickness direction.
Figure 10:
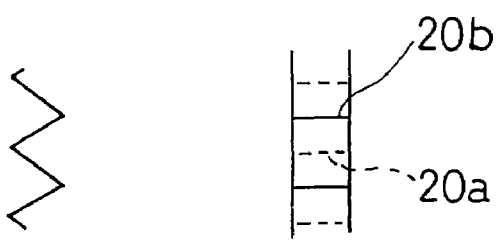
Figure 11:
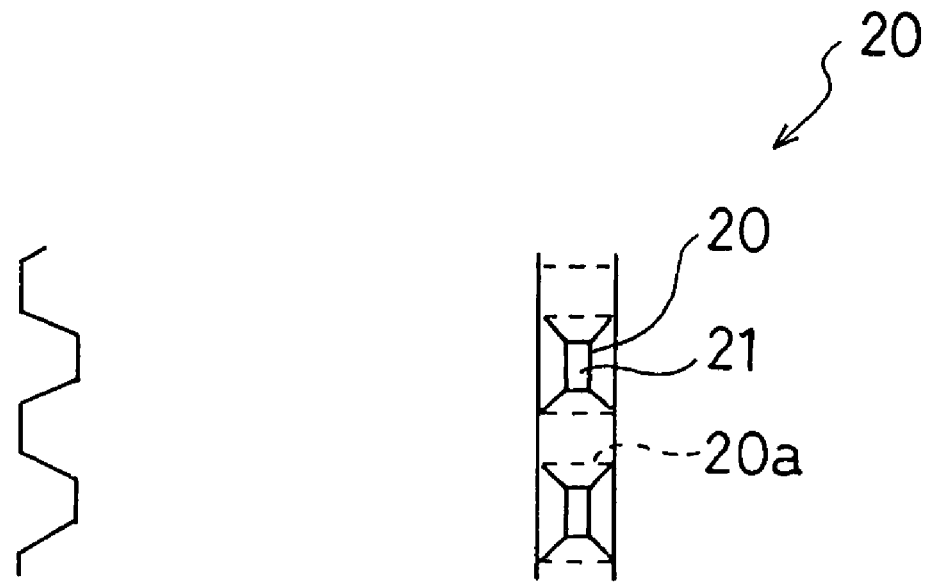
FIG. 11 illustrates views showing a situation of a convex of a circular plate imparted with concaves/convexes increasing a working degree in a plate thickness direction.
Figure 11:
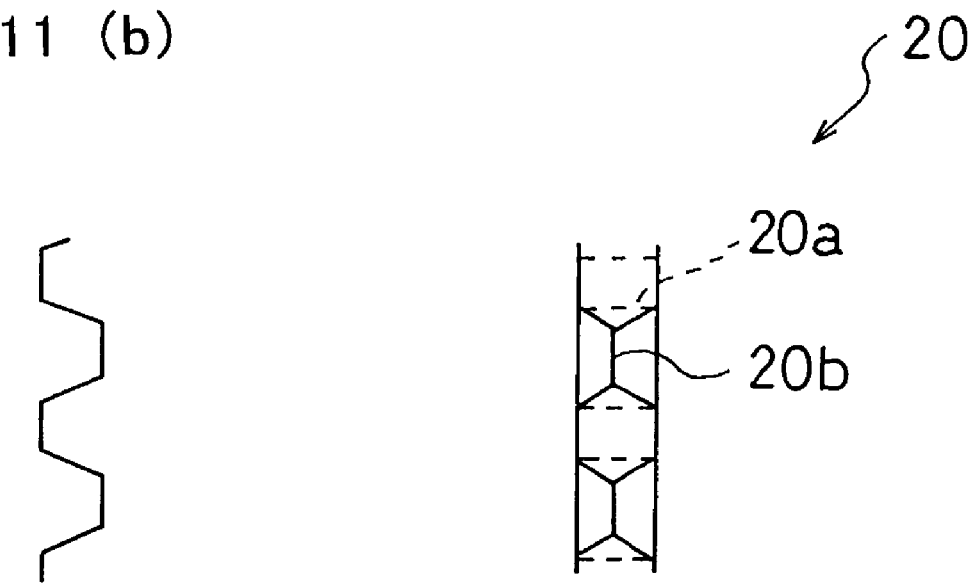

The shape of the convex 20a shown in FIG. 9 is that of a truncated quadrangular prism having a rectangular plane 21 at a front end thereof. With the shape as a basic shape, the convex 20b shown in FIG. 10(a) or FIG. 10(b) is provided by thinning a thickness in a circumferential direction T2 toward a front end thereof. The shape shown in FIG. 11(a), FIG. 11(b) or FIG. 8 is provided by thinning a thickness of the circular plate imparted with concaves/convexes in a plate thickness direction T1 (the same as the roller shaft direction) with the shape of the convex 20b shown in FIG. 9 as the basic shape.

Further, the thicknesses in the plate thickness direction T1 and the circumferential direction T2 can further be thinned until removing the rectangular plate 21 at the front end (refer to FIG. 10(b), FIG. 11(b). The shearing effect is excellent in the circular plate imparted with concaves/convexes removing the rectangular plane 21 at the front end in this way.

Further, when the concave 20a on the side of the roller in mesh with the convex 20b of the truncated quadrangular prism having the rectangular plane 21 at the front end is provided with substantially the same rectangular plane at the bottom and the depth is substantially the same as the height of the convex 20b, the surface area of the sheet-like object 6 can be made larger in the convex 20b of the truncated quadrangular prism having the rectangular plane 21 at the front end than the convexes 20b of the quadrangular prism which is not provided with the rectangular plane 21 at the front end. Thereby, an advantage of capable of providing a larger adsorbing effect to the object fabricated with concaves/convexes is achieved.

Further, in one roller, the lengths of the convex 21b and the concave 21a in the circumferential direction T2 are not necessarily equivalent to each other but may differ from each other. In that case, the lengths of the convex 21b and the concave 21a are adjusted to each other such that the rollers opposed to each other are brought in mesh with each other.

Further, various combinations of concaves/convexes can be given to the concaves/convexes shape in the roller shaft direction T1 when a single piece of the roller is viewed from a front side. For example, the shape of concaves/convexes is formed by repeating a predetermined pair of shape of concaves/convexes at a predetermined period. Further, the predetermined pair of shapes of concaves/convexes are not periodically repeated but all of the shapes are different from each other. In these cases, the diameters of the respective circular plates imparted with concaves/convexes are adjusted such that the rollers opposed to each other are brought in mesh with each other.

(Synthetic Concaves/Convexes Pattern)

In addition thereto, various combinations of concaves/convexes can be given to the shape of concaves/convexes in the circumferential direction T2 when the single circular plate imparted with concaves/convexes 20 is viewed from the side face. For example, the shape of concaves/convexes is formed by repeating a predetermined pair of shape of concaves/convexes at a predetermined period. Further, the predetermined period of shapes of concaves/convexes are not repeated periodically. All of the shape of concaves/convexes are different from each other.

Further, there is a case in which, for example, the shape of the concaves/convexes of a certain one of the circular plate imparted with concaves/convexes 20 is a pattern of concaves/convexes synthesized by combining two kinds or more of patterns of concaves/convexes. Also in this case, there are synthesized patterns of concaves/convexes in which a predetermined pair of patterns of concaves/convexes is periodically repeated, a predetermined pair of shape of concaves/convexes are not repeated periodically, or all of the concaves/convexes are different from each other.

Examples of synthesized patterns of concaves/convexes adopted in the circular plate imparted with concaves/convexes 20 according to the invention will be explained in reference to FIG. 12 through FIG. 14. In the respective drawings, two or more kinds of patterns of concaves/convexes are synthesized by a method similar to a method of synthesizing a plurality of waves by a principle of superposing. A pattern of concaves/convexes of the circular plate imparted with concaves/convexes appear as a combined synthesized pattern of concaves/convexes and shown by a contour line of concaves/convexes viewed from a side face of the circular plate imparted with concaves/convexes. Further, in the drawings, a one-dotted chain line 0 designates a reference face of concaves/convexes and the reference diameter in fabricating the circular plate imparted with concaves/convexes 20 is determined thereby.

Figure 12:
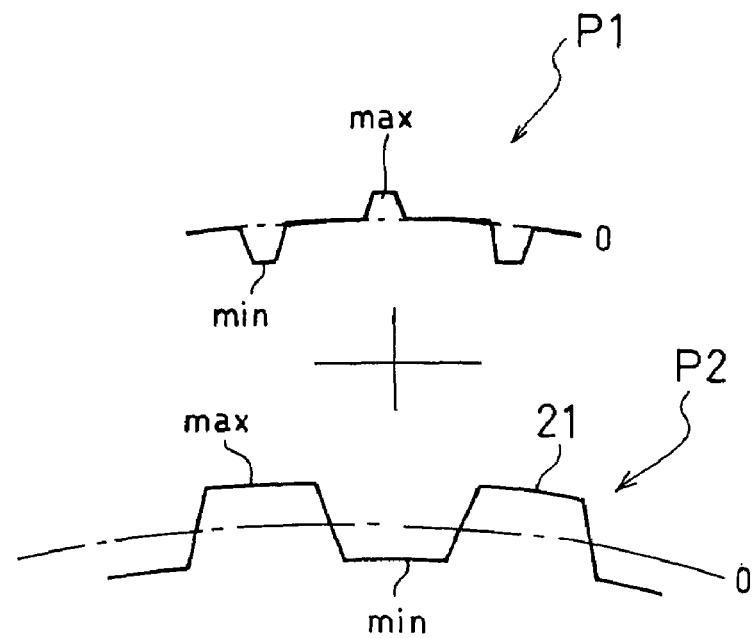
FIG. 12, FIG. 13 and FIG. 14 are views showing various shapes of concaves/convexes of circular plates imparted with concaves/convexes synthesized with two kinds of concaves/convexes patterns.
Figure 12:
Figure 12:
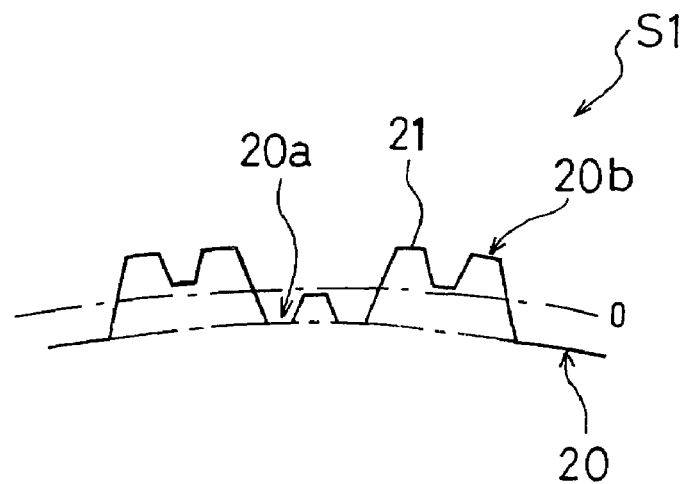

FIG. 12 shows a synthesized pattern of concaves/convexes S1 formed by combining two kinds of patterns of concaves/convexes P1 and P2. A maximum portion max of the second pattern of concaves/convexes P2 and a minimum portion min of a first pattern of concaves/convexes P1 overlap each other and a minimum portion min of the second pattern of concaves/convexes P2 and a maximum portion max of the first pattern of concaves/convexes P1 overlap each other. Specifically, the rectangular plane 21 of the truncated quadrangular prism constituting the maximum portion max of the second pattern of concaves/convexes P2 is provided with a concave constituting the minimum portion min of the first pattern of the concaves/convexes P1. As a result, concaves/convexes having different depths (heights) are mixed in steps.

Figure 13:
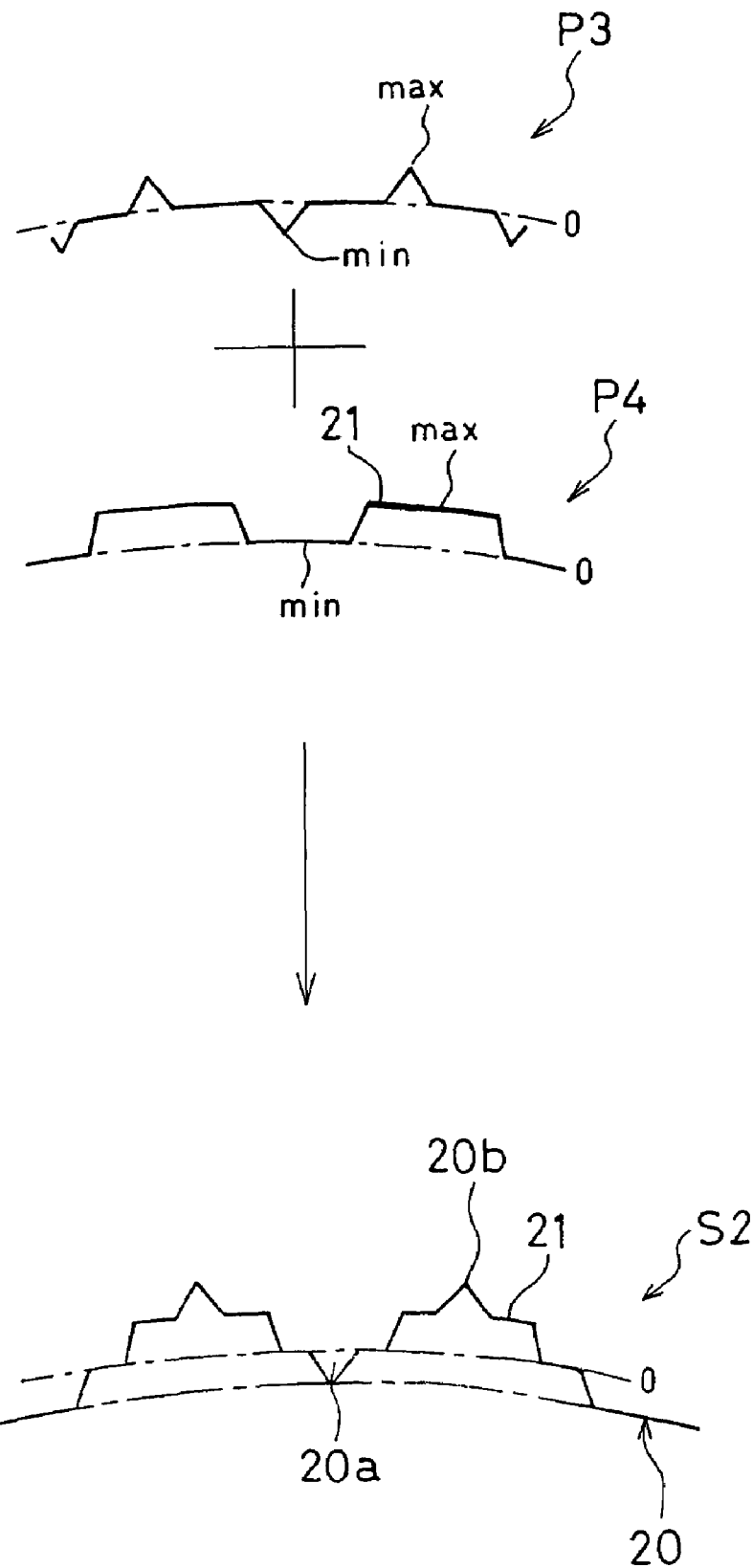

FIG. 13 similarly shows a synthesized pattern of concaves/convexes S2 formed by combining two kinds of a first and a second pattern of concaves/convexes P3 and P4 and maximum portions max and minimum portions min of the respectives overlap each other. Specifically, the rectangular plane 21 of the truncated quadrangular prism constituting the maximum portion max of the second pattern of concaves/convexes P4 is provided with a convex constituting the maximum portion max of the first pattern of concaves/convexes P3. As a result, concaves/convexes are formed in a steps-like shape.

Figure 14:
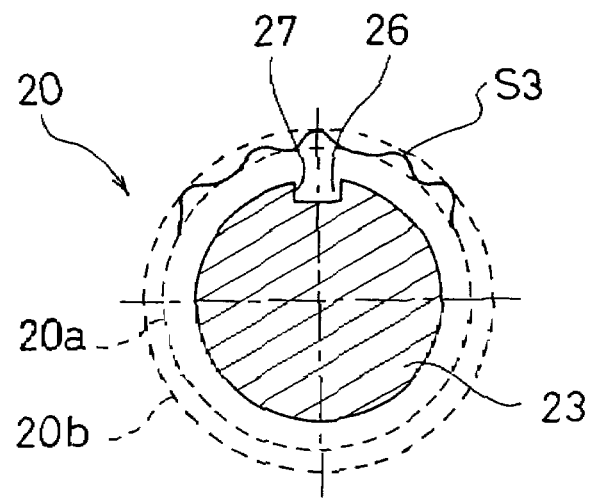

FIG. 14 similarly shows a synthesized pattern of concaves/convexes S3 formed by combining two kinds of patterns of concaves/convexes. Small convexes and large convexes appear alternately in a synthesized shape of concaves/convexes and concaves/convexes are smoothed as a whole. Further, although concaves/convexes are partially shown in the drawing, other portion is omitted by chain lines. The chain line on the inner side designates the concave 20*a* and the chain line on the outer side designates the convex 20*b*.

In this way, the pattern of concaves/convexes of the circular plate imparted with concaves/convexes is not necessarily one kind of a pattern of concaves/convexes but may be combined with two kinds or more of patterns of concaves/convexes as shown by the above-described drawings. By using the circular plate 20 imparted with concaves/convexes combined with two kinds or more of patterns of concaves/convexes, patterns of concaves/convexes having different aesthetic outlooks and excellent cushioning performance can be produced.

In this way, circular plates imparted with concaves/convexes having various shapes of concaves/convexes can be formed. Further, the thickness of the circular plate imparted with concaves/convexes can variously be changed. For that purpose, circular plates imparted with concaves/convexes having different concaves/convexes can mixedly be used and circular plates imparted with concaves/convexes having various thicknesses can mixedly be used for a single piece of roller.

A predetermined pattern can be produced in an object fabricated with concaves/convexes by producing a patternless portion in a pattern of concaves/convexes by thinning a predetermined portion of concaves/convexes of the circular plate imparted with concaves/convexes 20, or constituting predetermined concaves/convexes of a predetermined portion in concaves/convexes of the circular plate 20 by concaves/convexes different from the concaves/convexes at other than the predetermined portion.

Further, also in the case of a circular plate imparted with concaves/convexes comprising two kinds or more of concaves/convexes, circular plates imparted with concaves/convexes comprising different concaves/convexes can mixedly be used.

(Shearing Mechanism)

Further, a shearing mechanism can be provided at either of the rollers or at the two rollers. An example thereof will be explained in reference to FIG. 15 through FIG. 17.

Figure 15:
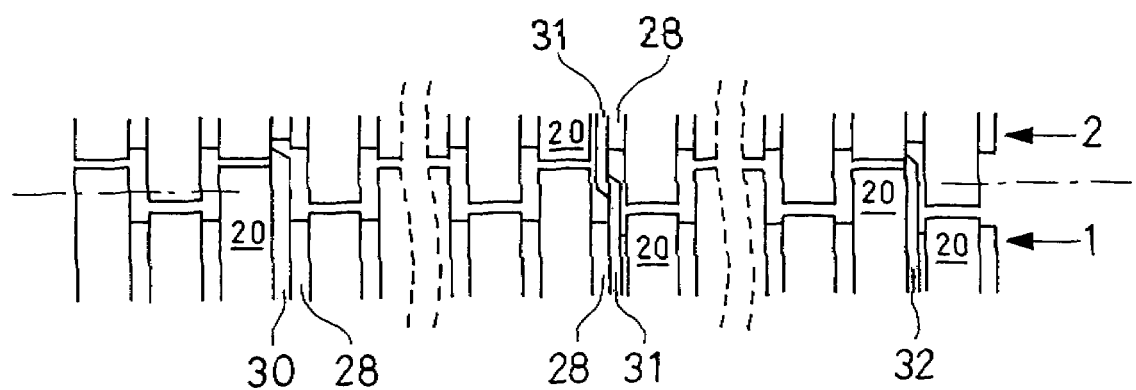
FIG. 15 and FIG. 16 are views showing meshed states of rollers when various spacers having shears are integrated.
Figure 16:
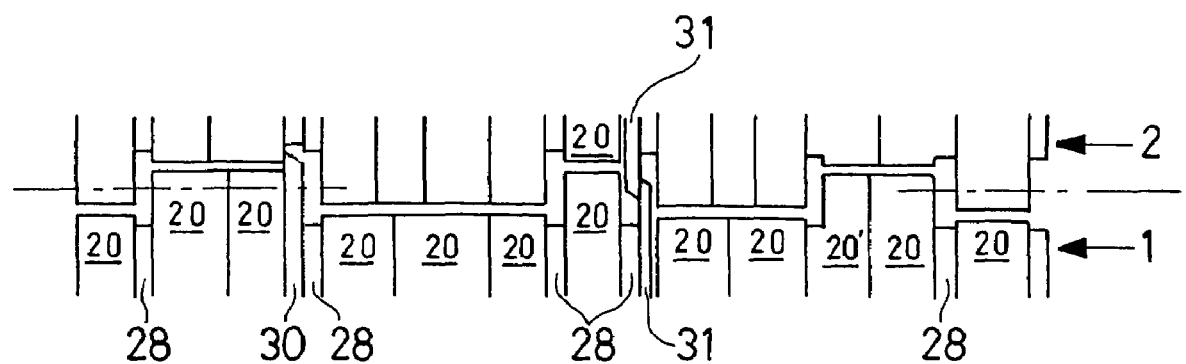

FIG. 15 and FIG. 16 show a portion of bringing the two rollers in mesh with each other viewed from a front side. In FIG. 15, the circular plates imparted with concaves/convexes 20 and the spacers 28 are alternately arranged. In FIG. 16, the spacers 28 are interposed between a single or a group of a plurality of the circular plates 20 imparted with concaves/convexes laminated to constituted one group. Notation 20' designates a circular plate imparted with concaves/convexes integrated with a spacer.

In the drawings, a shear is provided at the spacer and the spacer which is the interval keeping mechanism serves also as the shearing mechanism.

A first spacer having a shear 30 is provided with a diameter larger than the outer diameter of the circular plate 20 imparted with concaves/convexes and interposed between the circular plate imparted with concaves/convexes 20 and the spacer 28 which is not provided with the shear.

A second spacer having a shear 31 is provided with a shear having a diameter larger than a diameter of a middle of the concave 20*a* and the convex 20*b* of the circular plate imparted with concaves/convexes 20 and is interposed between the circular plate imparted with concaves/convexes 20 and the spacer 28 which is not provided with the shear.

In FIG. 15, a spacer having a third shear 32 is provided with a diameter larger than the outer diameter of the circular plate imparted with concaves/convexes 20 and is interposed between the circular plates imparted with concaves/convexes 20.

Figure 17:
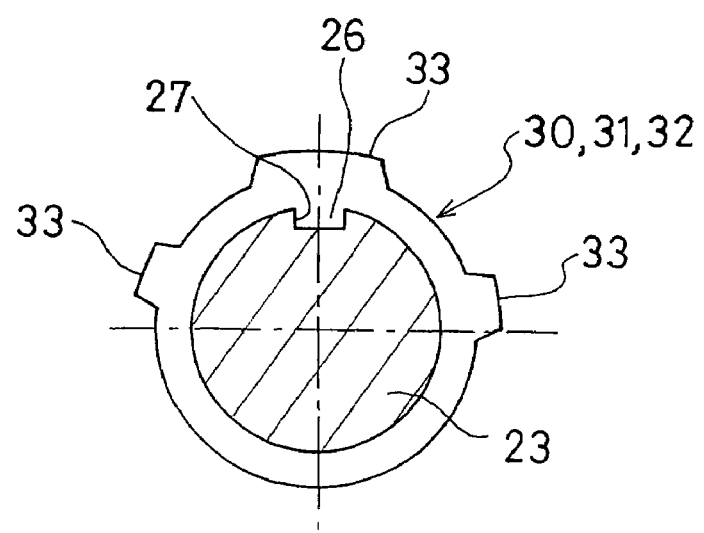
FIG. 17 is a view showing a spacer having a shear provided with a shear which is partial with respect to a circumferential direction.

FIG. 17 shows a side face of the spacer 30, 31, or 32 partially provided with a shear 33. By partially providing a shear 33 in the circumferential direction, the sheet-like object can partially be cut. A single or a plurality of numbers of the shears 33 may be provided and a length or an interval of the shear can arbitrary be set. Further, the shear 33 may be provided over a total periphery thereof. Further, a spacer partially having the shear 33, a spacer having the shear 33 over the total periphery and the spacer 28 which is not provided with the shear 33 may arbitrarily be mixed. Further, as the structure of attaching the spacer having the shear 33 partially or over the total periphery thereof, a structure similar to the structure of attaching the circular plate imparted with concaves/convexes 20 can be adopted. For example, the projection 26 for constituting the key explained in reference to FIG. 3 is provided on the inner diameter of the spacer having the shear and the key slot 27 extended in the axial direction is provided at a predetermined location of the roller shaft 23. By fitting the projection 26 into the key slot 27, the position of the shear is fixed on the roller shaft 23.

(Circular Plate Fixing Mechanism)

Next, an explanation will be given of an example of a mechanism of fixing a circular plate of the circular plate imparted with concaves/convexes 20, a circular plate which is not provided with concaves/convexes or the like and a spacer of the spacer having the shear or the like adopted in the invention to the roller shaft. In reference to FIG. 3 and FIG. 17, an explanation has already been given to the fixing mechanism in which the projection 26 constituting the key is provided on the inner diameter side of the circular plate or the spacer and the key slot 27 is provided on the side of the roller shaft. Otherwise, there are mechanisms shown in FIGS. 18 through 21. Although in these drawings, the circular plate imparted with concaves/convexes 20 is exemplified, the mechanism can also be adopted to the circular plate of the circular plate which is not provided with concaves/convexes or the like and the spacer having the shear. When the mechanisms adopted to the circular plate imparted with concaves/convexes 20 are adopted, a plurality of the circular plates imparted with concaves/convexes can be fixed to a single piece of the roller shaft by pertinently shifting pitches of concaves/convexes.

Figure 18:
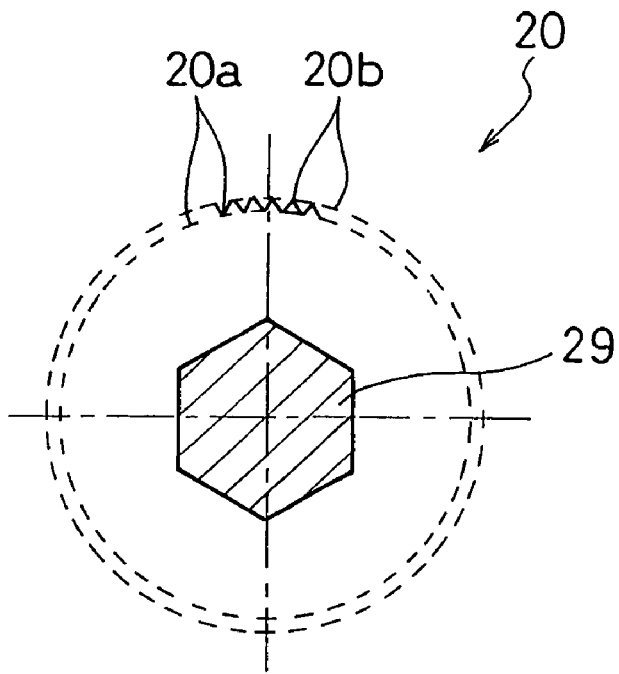
FIG. 18, FIG. 19, FIG. 20 and FIG. 21 are views showing various structures of fixing a circular plate imparted with concaves/convexes or the like to a roller shaft.

FIG. 18 shows an example of constituting a sectional shape of the roller shaft 29 by a polygonal shape and making a shape of the inner diameter of the circular plate imparted with concaves/convexes 20 coincide with the sectional shape. The position of the concaves/convexes portions of the circular plate imparted with concaves/convexes 20 is fixed on the roller shaft 29 by only inserting the roller shaft 29 into the circular plate imparted with concaves/convexes 20. With respect to contiguous ones of the circular plates imparted with concaves/convexes 20, by shifting sides of the polygonal shape of the circular plate imparted with concaves/convexes 20 coinciding with sides of the polygonal shape of the roller shaft 29, the circular plates imparted with concaves/convexes 20 can be fixed to a single piece of the roller shaft while pertinently shifting pitches of concaves/convexes. Further, although a hexagonal shape is adopted as the polygonal shape in the drawing, an arbitrary polygonal shape of a pentagonal shape, a quadrangular shape, a triangular shape or the like, can pertinently be adopted.

Figure 19:
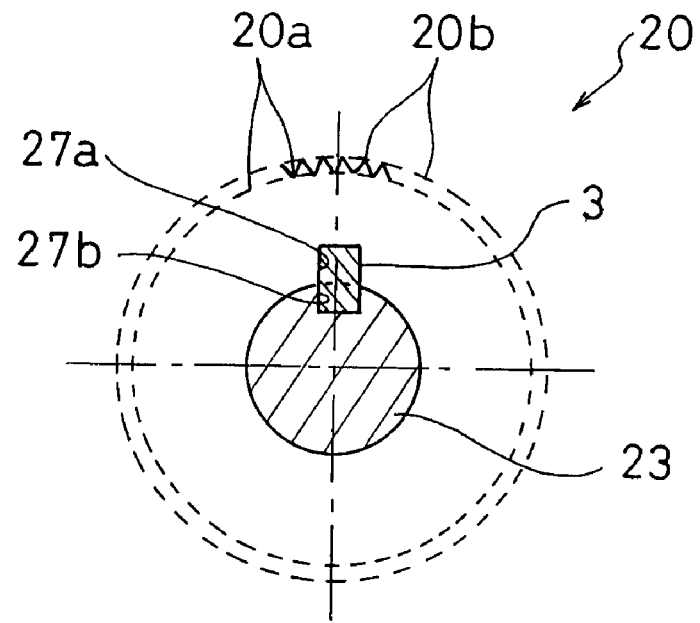

FIG. 19 shows an example of providing a first key slot 27a on the inner diameter side of the circular plate imparted with concaves/convexes 20 and providing a second key slot 27b extended in the axial direction at a predetermined location of the roller shaft 23. A key stick 3 constituting a key common to both of the first and the second key slots 27a and 27b is inserted into a space formed by the second key slot 27b. Further, the circular plate imparted with concaves/convexes 20 is rotated in the circumferential direction and the roller shaft 23 is inserted therethrough to make the first and the second key slots 27a and 27b coincide with each other. Thereby, the position of the concaves/convexes portion of the circular plate imparted with concaves/convexes 20 is fixed on the roller shaft 23. When adopted in the circular plate imparted with concaves/convexes 20, by pertinently changing the position of the key slot 27a, the circular plates imparted with concaves/convexes 20 can be fixed to a single piece of the roller shaft while pertinently shifting the pitches of the concaves/convexes. Further, the number of the keys or the key slots is arbitrary and pertinently selected.

Figure 20:
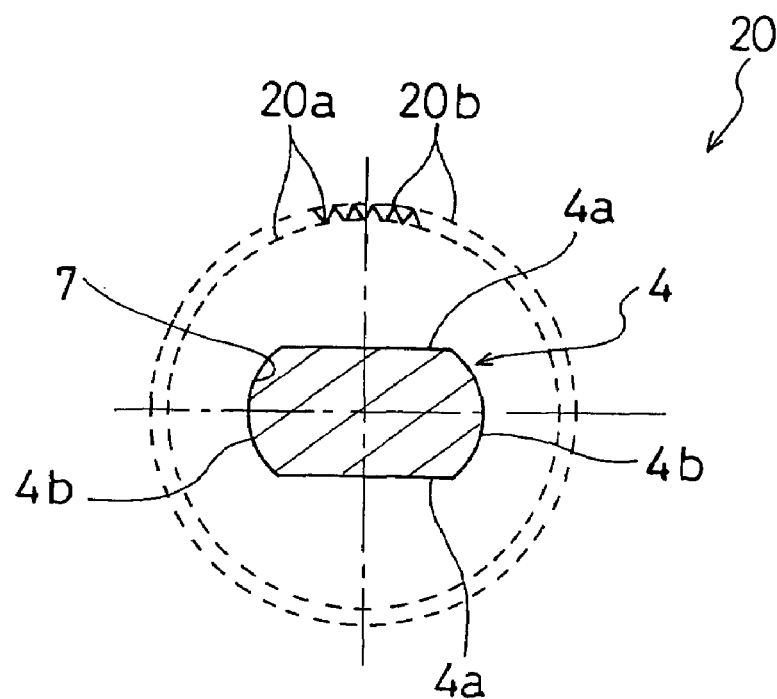

FIG. 20 shows an example of constituting a sectional shape of a roller shaft 4 by pairs of two chords and two circular arcs 4b opposed to each other and making a shape of an inner diameter 7 of the circular plate imparted with concaves/convexes 20 coincide with the sectional shape. By only inserting the roller shaft 4 through the circular plate imparted with concaves/convexes 20, the position of the concaves/convexes portion of the circular plate imparted with concaves/convexes 20 is fixed on the roller shaft 4. When the attaching structure is adopted, contiguous ones of the circular plates imparted with concaves/convexes 20 can be fixed to the roller shaft 4 by shifting from each other by 180°. Further, a number of the chords is arbitrary and pertinently selected.

Figure 21:
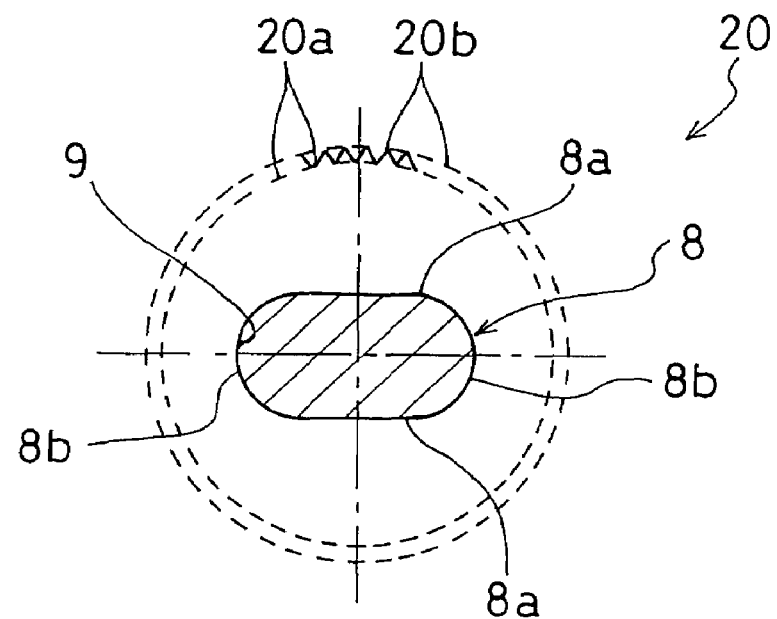

FIG. 21 shows an example of constituting a section of a roller shaft 8 by an oval shape comprising pairs of two linear lines 8a and two semicircular shapes 8b opposed to each other and making a shape of an inner diameter 9 of the circular shape imparted with concaves/convexes 20 coincide with the oval shape. By only inserting the roller shaft 8 through the circular plate imparted with concaves/convexes 20, the position of the concaves/convexes portion of the circular plate imparted with concaves/convexes 20 is fixed on the roller shaft 8. When the attaching structure is adopted, contiguous ones of the circular plates imparted with concaves/convexes 20 can be fixed to the roller shaft 8 by shifting from each other by 180°.

Even when any of the above-described attaching structures is adopted, contiguous ones of the circular plates imparted with concaves/convexes 20 can be fixed to the roller shaft by shifting from each other by 180°. In the case of the circular plates 20 constituting phases thereof inverse to each other such that shapes of concaves/convexes disposed at starting points and end points of chords passing centers of the circular plates constitute a convex opposed to a concave or a concave opposed to a convex, for example, in the case in which sets of pairs of concaves/convexes are of an odd number, contiguous ones of the circular plates imparted with concaves/convexes 20 may be fixed to the roller shaft by shifting from each other by 180°. Thereby, when a single piece of the roller is viewed from the front side, concaves and convexes appear alternately.

(Bending Preventive Mechanism)

Depending on the condition of the sheet-like object 6, the sheet-like object 6 may be bent and a commercial value thereof is reduced. FIG. 22(a) and FIG. 22(b) show an example of a mechanism for preventing the bending. FIG. 22(a) and FIG. 22(b) are outline views viewing a behavior of supplying the sheet-like object 6 to the apparatus from a side of the rollers 1 and 2.

In FIG. 22(a), the sheet-like object 6 is supplied to between the two rollers 1 and 2 from a position disposed on an upper side of a horizontal line by a predetermined angle θ. Therefore, a supply base 10 is inclined to the horizontal line by the predetermined angle θ toward the rollers 1 and 2. This is for providing bending in a direction reverse to a direction of bending produced by fabricating concaves/convexes to cancel. Therefore, the predetermined inclination angle θ and direction are determined in accordance with the bending produced by fabricating concaves/convexes. That is, these are determined in the angle and the direction for providing the bending for canceling the bending produced by fabricating concaves/convexes.

Further, as shown by a two-dotted chain line in the drawing, the bending can also be prevented by making the outer diameter, the reference diameter of the circular plate imparted with concaves/convexes or the like and the roller shaft diameter differ from each other between one roller and a roller opposed thereto. For example, the bending is prevented by making the diameter of the upper stage roller smaller than that of the lower stage roller as shown in the drawing.

In FIG. 22(b), a guide rod 34 is further provided at a vicinity of the roller 1 other than the supply base 10. A roller or a simple round bar is used for the guide rod 34.

Further, it is preferable to make the supply base angle θ and the attaching position of the guide rod 34 changeable in consideration of the condition and the shape of the sheet-like object 6. Further, although in the illustrated example, the bending preventive mechanism is provided on the supply side of the sheet-like object, the bending preventive mechanism may be provided on a side opposed to the supply side.

(Heating Mechanism or the Like)

Depending on the condition of the sheet-like object 6, the sheet-like object 6 may be heated in imparting concaves/convexes. FIG. 23 shows an example of a heating mechanism or the like. The heating mechanism is provided at either or both of the two rollers. FIG. 23 is an outline view showing inside of the roller shaft 23 when the rollers 1 and 2 are viewed from the front side.

As an example of a mechanism of heating the rollers 1 and 2, the roller shaft 23 is integrated with a heating generating body 43. A core portion of the roller shaft 23 is hollowed, the heat generating body 43, for example, a nichrome line is embedded in the hollowed portion and the heat generating body is connected to a slip ring 42 provided on an electrically insulating body 41.

Meanwhile, power is transmitted from a slip ring brush 44 to the heat generating body 43 via the slip ring 42 to generate heat, the circular plate imparted with concaves/convexes 20 is heated from the shaft core side, in fabricating concaves/convexes, heat is applied to a resin sheet having a thermally deforming property to soften the material to promote thermal deformation to thereby form sufficient concaves/convexes.

Further, an interval between the heat generating body 43 and the roller shaft 23 is subjected to a sufficient electrically insulating treatment by a material having an excellent electrically insulating property and having excellent heat resistance, for example, a ceramic fiber blanket, silicon carbide, silica or the like.

As other heating mechanisms there are a mechanism of a fixed type which is not rotated and constituted by hollowing the roller shaft 23 and simply inserting a heat generating body into the hollowed hole and a mechanism of heating the roller from outside.

As a temperature detecting mechanism, there is a mechanism provided with a noncontact temperature measuring apparatus at outside of the roller, a mechanism of hollowing the roller shaft similar to the above-described mechanism of integrating the heat generating body and providing a thermocouple or the like at the hollowed hole or the like.

As a temperature control apparatus, a heat source necessary for controlling temperature of a heat generating body may be supplied by comparing previously set temperature and temperature detected by a temperature detecting mechanism.

(Backup Mechanism)

When a total length of the roller is prolonged in order to impart concaves/convexes to a sheet-like object having a wide width, the roller per se may be bent in a bow-like shape. In such a case it is preferable to provide a backup mechanism by a backup roller to prevent the roller per se from being bent. An example of a backup mechanism will be explained in reference to FIG. 24 through FIG. 29.

FIG. 24 is an outline view showing a situation of using an apparatus for imparting concaves/convexes. The lower stage roller 1 for imparting concaves/convexes is backed up by a lower backup roller 50. Further, the upper stage roller 2 for imparting concaves/convexes may be backed up by an upper backup roller 60 shown in FIG. 28, mentioned later.

Further, hereinafter, the roller for imparting concaves/convexes 1 at the lower stage is referred to as the first roller 1 and the roller for imparting concaves/convexes 2 at the upper stage is referred to as the second roller 2.

(Backup Roller)

FIG. 25(*a*) and FIG. 25(*b*) show a structure of supporting the first roller by the lower backup roller 50. FIG. 25(*a*) shows the supporting structure viewed from a side thereof and FIG. 25(*b*) shows the supporting structure viewed from a front side. Further, also a structure for supporting the second roller 2 by the upper backup roller 60 shown in FIG. 28, mentioned later, is provided with the similar structure.

The lower backup roller 50 is provided with a single or a plurality of circular plates for backup 51 which is fixed onto a backup roller shaft and is not provided with concaves/convexes. The circular plate(s) for backup 51 is(are) provided at a position(s) in correspondence with either or both of the spacer 28 of the roller to be backed up and a circular plate 35 which is not provided with concaves/convexes, mentioned later. The circular plate(s) for backup 51 support(s) either or both of the spacer 28 and the circular plate 35 which is not provided with concaves/convexes of the first roller. When the first roller 1 which is not provided with the circular plate 35 which is not provided with concaves/convexes as shown by FIG. 1 is backed up, only the spacer 28 of the first roller 1 is supported. In the case of the first roller which is not provided with the spacer 28, only the circular plate 35 which is not provided with concaves/convexes is supported.

Although the roller backup roller 50 is integrated by a structure similar to that of the first roller 1 by using the circular plate for backup 51, the lower backup roller 50 may be fitted to a shaft by a shrinkage fit.

Figure 26:
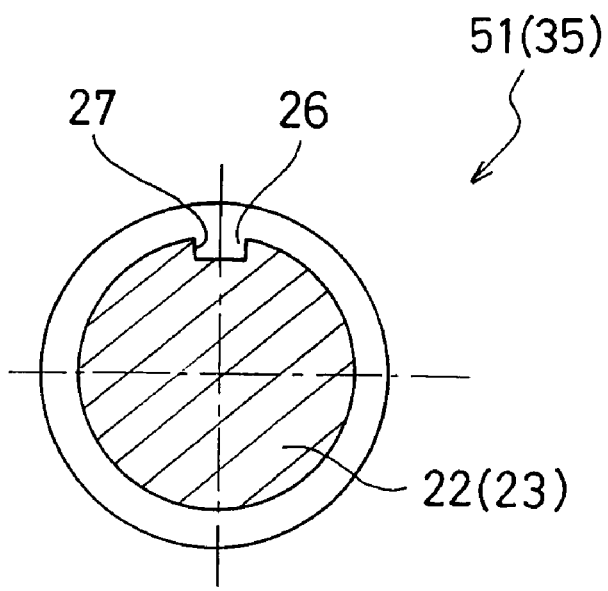
FIG. 26 is a side view of a circular plate which is not provided with concaves/convexes and a circular plate for backup.

The shape of the circular plate for backup 51 is a shape of a ring-like circular plate as shown by, for example, FIG. 26 and is a shape similar to the shape of the circular plate 35 which is not provided with concaves/convexes. The projection 26 for constituting the key is provided on an inner diameter side of the circular plate for backup 51. A position of the circular plate for backup 51 is fixed on a backup roller shaft 22 by fitting the projection 26 into the key slot 27 provided at a predetermined location of the backup roller shaft 22 and extended in an axial direction. Otherwise, as means for fixing the circular plate for backup 51 onto the backup roller shaft 22, various means similar to those explained in the circular plate imparted with concaves/convexes 20 can be used.

A thickness and an outer diameter of the circular plate for backup 51 is designed and fabricated in accordance with a portion used, for example, a portion for the spacer 28 or a portion of the circular plate 35 which is not provided with concaves/convexes. As a material therefor, a material similar to the material of the roller for imparting concaves/convexes 1 is used.

(Sliding Preventive Mechanism)

Further, it is preferable to provide a mechanism of preventing from sliding by pertinently selecting at least one kind of a group constituting of the circular plate 35 which is not provided with concaves/convexes, the spacer 28 and the circular plate for backup 51. The sliding preventive mechanism may be the circular plate 35 or 51 or the spacer 28 an outer periphery of which is attached with small concaves/convexes in a shape of teeth of a gear or knurled, or to a degree of simply attaching a fine linear mark in the plate thickness direction of the circular plate 35 or 51 or the spacer 28.

When the sliding preventive mechanism is provided to the circular plate 35 which is not provided with concaves/convexes, in a single or a plurality of the circular plates 35 which are not provided with concaves/convexes to be backed up, the sliding preventive mechanism is provided at outer peripheries of a certain number of the circular plates 35 which are not provided with concaves/convexes. When the sliding preventive mechanism is provided at the spacer 28, in a single or a plurality of the spacers 28 to be backed up, the sliding preventive mechanism is provided at outer peripheries of a certain number of the spacers 28. When the sliding preventive mechanism is provided at the circular plate for backup 51, in a single or a plurality of the circular plates for backup 51, the sliding preventive mechanism is provided at outer peripheries of a certain number of the circular plates for backup 51.

Further, the circular plate 35 which is not provided with concaves/convexes, the spacer 28 and the circular plate for backup 51 to be backed up are mainly prevented from being slid and may not carry a burden of load the same as backup load carried by the circular plate 35 or 51 or the spacer 28 which is not provided with the sliding preventive mechanism.

(Integrated Structure of First and Second Rollers 1, 2)

Figure 27:
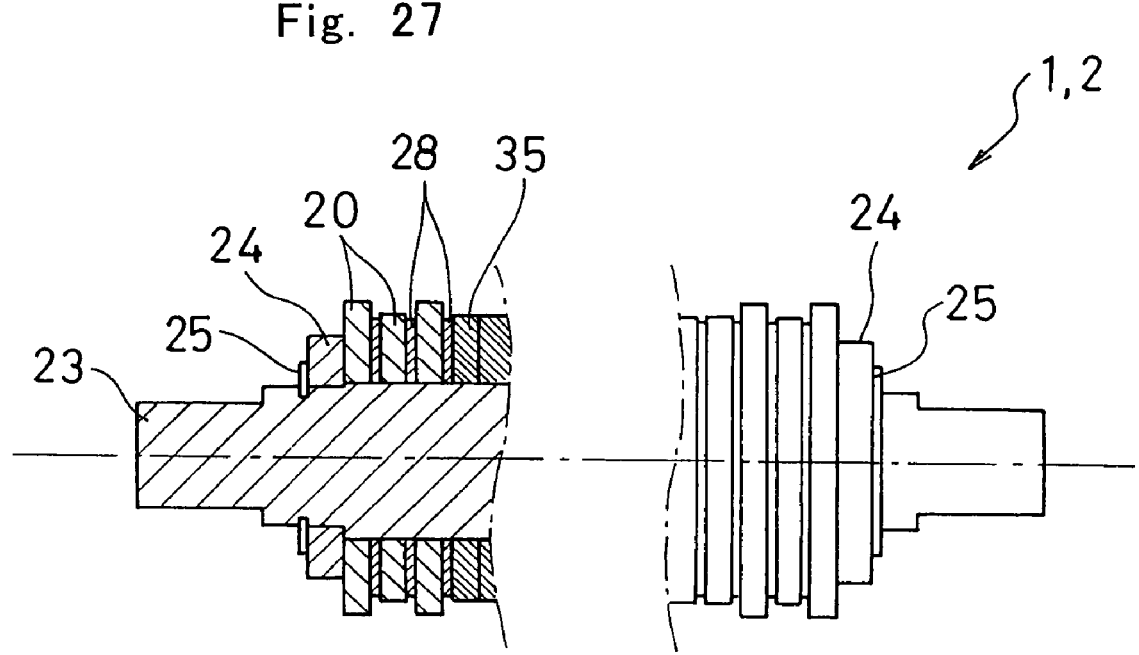
FIG. 27 is a partially sectional view of a roller for imparting concaves/convexes integrated with a circular plate which is not provided with concaves/convexes.

FIG. 27 shows an example of the first roller 1 preferable in providing the backup mechanism. Further, it is preferable that also a structure of integrating the second roller 2 backed up by the upper backup roller 60 illustrated in FIG. 28, mentioned later, is constituted by a similar structure. Further, the first and the second rollers 1 and 2 provided with the backup mechanisms are not limited thereto but may be the above-described first and second rollers 1 and 2, further, may be the first and second rollers 1 and 2, mentioned later.

In the example shown in FIG. 27, in order to facilitate to back up by the backup roller 50, a single or a plurality of the circular plates 35 which are not provided with concaves/convexes to be backed up by the circular plate(s) for backup 51 of the backup roller 50 is(are) provided. Further, when the circular plate which is not provided with concaves/convexes for forming a patternless portion in a pattern by concaves/ convexes imparted to the sheet-like object 6 by the roller for imparting concaves/convexes is provided, the circular plate which is not provided with the concaves/convexes may be backed up. It is not necessary to newly provide the circular plate 35 which is not provided with concaves/convexes Further, when concaves/convexes to be backed up.

The first roller 1 is integrally constituted by pertinently and alternately fitting the circular plates imparted with concaves/convexes 20, the spacers 28 and the circular plates 35 which are not provided with concaves/convexes via the snap ring 25 and the holder plate 24 fitted at the start end of the roller shaft 23 and grubbing and fixing the final end by the holder plate 24 and the snap ring 25 similar to the start end.

The length of the roller shaft 23 is determined in consideration of a working width of the sheet-like object 6 to be fabricated with concaves/convexes, price of the apparatus or the like and is about 500 mm through 1200 mm. Further, the roller shaft diameter is about 40 mm through 100 mm although determined in consideration of the length of the roller shaft and the condition of the sheet-like object 6 to be fabricated with concaves/convexes. Naturally, smaller or larger dimensions of the length of the portion of the roller to be fabricated with concaves/convexes and the roller shaft diameter can also be fabricated as necessary and determined in consideration also of a relationship with the backup roller.

Further, as shown by, for example, FIG. 26, the shape of the circular plate 35 which is not provided with concaves/convexes is that of a ring-like circular plate having a shape similar to that of the circular plate for backup 51. The projection 26 for constituting the key is provided on the inner diameter side of the circular plate 35 which is not provided with concaves/convexes. The position of the circular plate 35 which is not provided with concaves/convexes is fixed on the roller shaft 23 by fitting the projection 26 into the key slot 27 provided at a predetermined location of the roller shaft 23 and extended in the axial direction. Otherwise, as means for fixing the circular plate 35 which is not provided with concaves/convexes onto the roller shaft 23, various means similar to those explained in the circular plate imparted with concaves/convexes 20 can be used.

The thickness of the circular plate 35 which is not provided with concaves/convexes substantially similar to that of the circular plate imparted with concaves/convexes 20 is used. The thickness of the circular plate imparted with concaves/convexes 20 is generally about 2 mm through 4 mm. As the outer diameter of the circular plate 35 which is not provided with concaves/convexes, a diameter the same as a diameter of a portion of the circular plate imparted with concaves/convexes 20 which is not provided with convexes (bottom of concave) is used. The inner diameter of the circular plate 35 which is not provided with concaves/convexes is determined in consideration of tolerance with the diameter of the roller shaft 23 as a reference. A metal material of steel, aluminum, stainless steel, titanium, copper or the like or a nonmetallic material of hard resin, rubber or the like is used for the circular plate 35 which is not provided with concaves/convexes. The spacer 28 may serve as the circular plate 35 which is not provided with concaves/convexes by adjusting the thickness or the outer shape of the spacer 28. In that case, it is necessary to provide means for fixing the spacer 28 to the roller shaft 23 by providing the projection 26 constituting the key at the inner diameter of the spacer 28 or the like.

The spacer 28 is pertinently used between the circular plates imparted with concaves/convexes or the circular plate 35 which are not provided with concaves/convexes as necessary, the shape is similar to that of the circular plate 35 which is not provided with concaves/convexes and as the thickness, a thickness of 0.5 mm through 4.0 mm is generally used, and as the outer diameter, an outer diameter smaller than the outer diameter of the circular plate 35 which is not provided with concaves/convexes by several mm is used.

However, the circular plate imparted with concaves/convexes 20, the circular plate 35 which is not provided with concaves/convexes and spacer 28 having thicker thicknesses are used as the apparatus becomes large-sized.

Generally, carbon steel or stainless steel is used for the roller shaft 23 and a metallic material of steel, aluminum, stainless steel, titanium, copper or the like, or a nonmetallic material of hard resin, rubber or the like is used for the circular plate imparted with concaves/convexes 20, the circular plate 35 which is not provided with concaves/convexes and spacer 28.

(Structure of Attaching Backup Roller)

Figure 28:
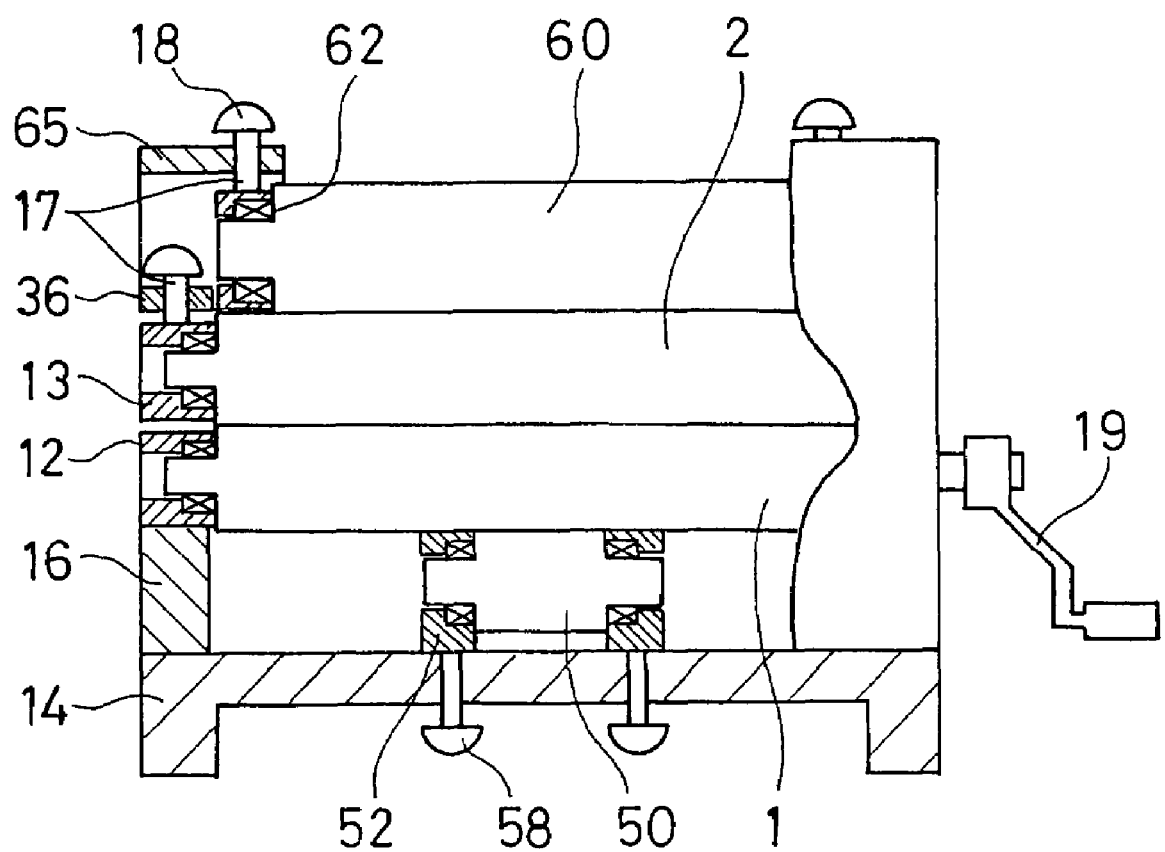
FIG. 28 is a sectional view when an example of an apparatus according to the invention integrated with a backup roller is viewed from a front side.

FIG. 28 and FIG. 29 are views showing an outline of an apparatus of imparting concaves/convexes. FIG. 28 is a partially sectional view when the apparatus is viewed from a front side and FIG. 29 is a side view. Further, the drawings show a case of providing the upper backup roller 60 also to the second roller 2 other than the lower backup roller 50.

The base plate 14 is fixedly attached with a side wall block comprising the pair of side pillars 11, a middle plate 36 and an upper plate 65 by a pair of left and right screws or the like. The lower piece 16 is provided at inside of the side wall block and the lower bearing base 12 and the upper bearing base 13 are fitted slidably between the side pillars further thereabove. The first roller 1 is attached to a left and right pair of the lower bearing bases 12 via bearings and the second roller 2 is attached to a left and right pair of the upper bearing bases 13 via bearings. The upper bearing base 13 is pressed downwardly by a pressing mechanism comprising the screw 17 screwed to the middle plate 36 and the clearance adjusting knob 18 and the clearance between the rollers can freely be adjusted in accordance with the thickness or the condition of the sheet-like object 6.

The lower backup roller 50 is fixedly attached to the base plate 14 by a pair of left and right lower backup roller bearing bases 52 by screws or the like for backing up the first roller 1 from a lowerside. Further, a height thereof is adjusted by interposing a shim plate between the base plate 14 and the lower backup roller bearing base 52 or by a push up bolt 58 or the like.

A pair of left and right bearing bases 62 of the upper backup roller 60 is constituted by a structure similar to that of the bearing bases 13 of the second roller 2 and pressed downwardly by the pressing mechanism comprising the screw 17 screwed to the upper plate 65 attached to the side pillar and the clearance adjusting knob 18 for backing up the second roller 2.

Further, although the two backup rollers 50 and 60 are generally attached symmetrically in the left and right direction, the two backup rollers 50 and 60 can also be attached nonsymmetrically in the left and right direction as necessary.

As is apparent also from FIG. 28, in view of a relationship of supply and discharge of the sheet-like object 6, the lower backup roller 50 is attached to the base plate 14. For that purpose, the roller backup roller 50 can be constituted by a roller having a length shorter than that of the first roller 1.

When the manual handle 19 is turned, the first roller 1 and the second roller 2 are rotated to provide concaves/convexes to the sheet-like object 6. Although FIG. 28 and FIG. 29 show a state of providing the manual handle to the first roller 1, the handle 19 may be provided at the second roller 2.

In the case of the apparatus for imparting concaves/convexes, a readymade product having a constant thickness is used for an object to be fabricated and therefore, uniformity or planarity of the object to be fabricated is ensured and there is frequently a case in which linearly of a roller face does not pose a significant problem. Therefore, one piece of the roller backup roller 50 is sufficient for the backup roller and in that case, as shown by FIG. 28, the backup roller 50 having a short length is sufficient therefor and the apparatus for imparting concaves/convexes is not so significantly large-sized.

Naturally, as shown by FIG. 28 and FIG. 29, two pieces of the backup rollers 50 and 60 may be provided therefor. In this case, the linearity of the roller face can be maintained and therefore, the planarity of the object fabricated with concaves/convexes can be ensured.

Although an explanation has been given of the backup mechanism by the backup roller constituted by the circular plates which are not provided with concaves/convexes as described above, the circular plate imparted with concaves/convexes 20 of the roller for imparting concaves/convexes may be backed up by using the backup roller constituted by circular plates imparted with concaves/convexes. The circular plate imparted with concaves/convexes for backup is constituted and integrated similar to the circular plate imparted with concaves/convexes 20 of the roller for imparting concaves/convexes. Further, the circular plate is attached to the apparatus for imparting concaves/convexes similar to the above-described.

(Imparting Convex to One Face)

The invention of the application is applicable not only to a case of imparting concaves/convexes to two front and back faces of a sheet-like object but also to the case of imparting convexes to one face of front and back faces of a sheet-like object.

When convexes are imparted to one face of front and back faces of a sheet-like object, the reference face of concaves/convexes of a circular plate imparted with concaves/convexes is changed and therefore, the reference diameter of the circular plate imparted with concaves/convexes is changed. The reference face is a face formed by the reference diameter in the circular plate.

The reference diameter of the circular plate imparted with concaves/convexes is changed such that one roller becomes a roller for imparting convexes to one face of the sheet-like object 6. Further, the reference diameter of the circular plate imparted with concaves/convexes is changed such that other roller becomes a roller which does not impart convexes to other face of the sheet-like object 6 while having concaves in correspondence with the convexes to thereby maintain a planar state as a whole. Therefore, although the constitution differs from the above-described with respect to a point shown below, the constitution is similar to that of the example of the above-described embodiment with respect to other point and therefore, an explanation thereof will be omitted.

(Circular Plate Imparted with Convexes, Circular Plate Imparted with Concaves)

FIG. 30(*a*) shows a circular plate imparted with convexes 37 for imparting convexes to one face of the sheet-like object 6. The circular plate imparted with convexes 37 is fabricated by constituting a distance from a center of a circular shape of the circular plate imparted with concaves/convexes to a bottom of the concave 20*a* as a reference radius R1/2. Therefore, the bottom of the concave 20*a* constitutes 0 point of concaves/convexes and therefore, the convex 20*b* becomes the convex 20*b* raised from a reference face F1.

FIG. 30(*b*) shows a circular plate imparted with concaves 38 which does not impart convexes to other face of the sheet-like object 6 while having concaves in correspondence with the convexes for maintaining a planar state as a whole. The circular plate imparted with concaves is fabricated by constituting a distance from a center of a circular shape of the circular plate imparted with concaves/convexes to a front end of the convex as a reference radius R2/2. Therefore, the front end of the convex 20*b* constitutes 0 point of concaves/convexes and therefore, the concave 20*a* becomes the concave 20*a* concaved from a reference face F2.

Although the same radius is generally adopted for the reference radius R1/2 of the circular plate imparted with convex 37 and the reference radius R2/2 of the circular plate imparted with concaves 38, the reference radii can be different from each other in consideration of pitches of the convexes and the concaves.

When the circular plate imparted with convexes 37 and the circular plate 35 which is not provided with concaves/convexes are combined, the reference diameter R1 of the circular plate imparted with convexes 37 is adopted for the radius of the circular plate 35 which is not provided with concaves/convexes. When the circular plate imparted with concaves 38 and the circular plate 35 which is not provided with concaves/convexes are combined, the reference diameter R2 of the circular plate imparted with concaves 38 is adopted for the diameter of the circular plate 35 which is not provided with concaves/convexes.

The outer diameter of the spacer 28 is generally smaller than the reference diameter and does not directly relate to forming convexes of the sheet-like object 6 different from the circular plate 35 which is not provided with concaves/convexes. Further, the spacer 28 may be provided with operation and effect similar to those of a spring washer by cutting the spacer 28 in the radial direction.

In the following explanation, for convenience of explanation, an explanation will be given by constituting the first roller 1 as a roller having the circular plate imparted with convexes 37 and constituting the second roller 2 as a roller having the circular plate imparted with concaves 38. However, the second roller 2 may be a roller having the circular plate imparted with convexes 37 or the first roller 1 may be a roller having the circular plate imparted with concaves 38.

Figure 31:
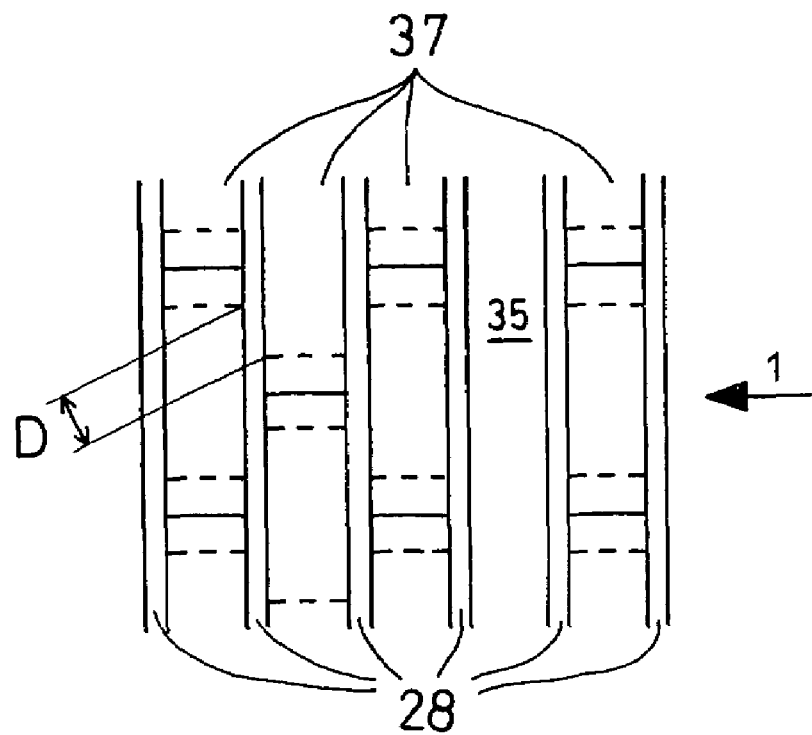
FIG. 31(a) is a view showing a plane view of a roller surface integrated with a circular plate imparted with convexes, a circular plate which is not provided with concaves/convexes anda spacer.
FIG. 31(b) is a view showing a meshed state by the roller of FIG. 31(a), FIG. 32 and FIG. 33 are views showing a meshed state of rollers when a circular plate imparted with convexes, a circular plate imparted with concaves, a circular plate which is not provided with concaves/convexes, a spacer and a spacer having a shear
Figure 31:
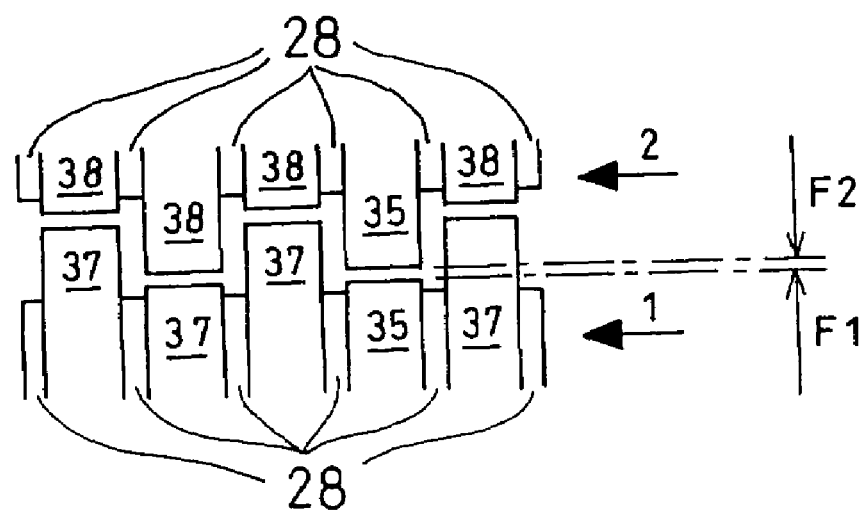

FIG. 31(*a*) is a view viewed from a top portion of the circular plate imparted with convexes 37 for illustrating the top portion of the convex 20*b* by a thick bold line and the start point of raising the convex 20*b* on the reference face by a broken line to facilitate to understand and illustrating the circular plate imparted with convexes 37 by shifting by a half pitch. FIG. 31(*b*) is a view viewing a meshed portion of the two rollers 1 and 2 from a front side.

The convex 20*b* or the concave 20*a* is provided such that the two portions are brought in mesh with each other and the convexes or the concaves are not proximate excessively as shown by a distance between contiguous convexes D of FIG. 31(*a*). Because when the convexes are excessively proximate, the effect of the convex is reduced. That is, it is necessary to constitute the distance between contiguous convexes D to be a pertinent size to sufficiently achieve the effect of the convex.

Figure 32:
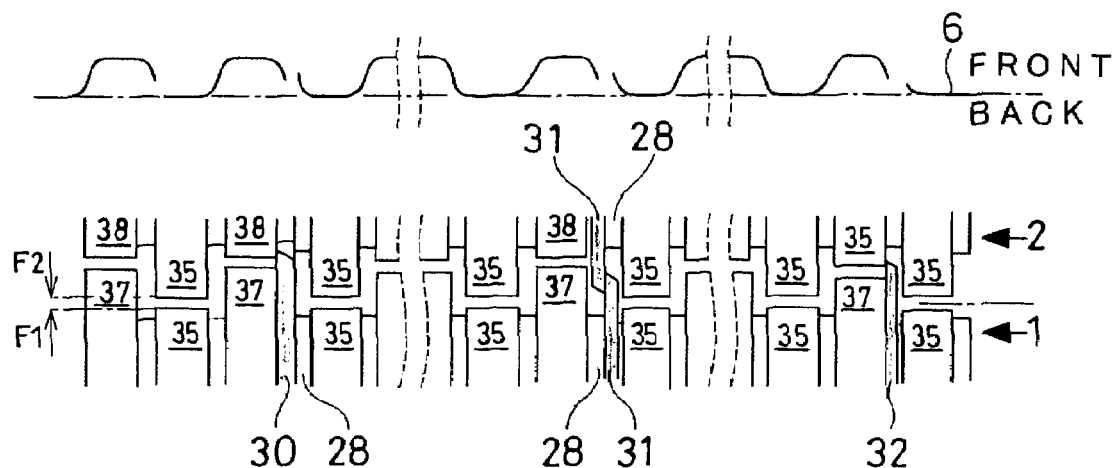
Figure 33:
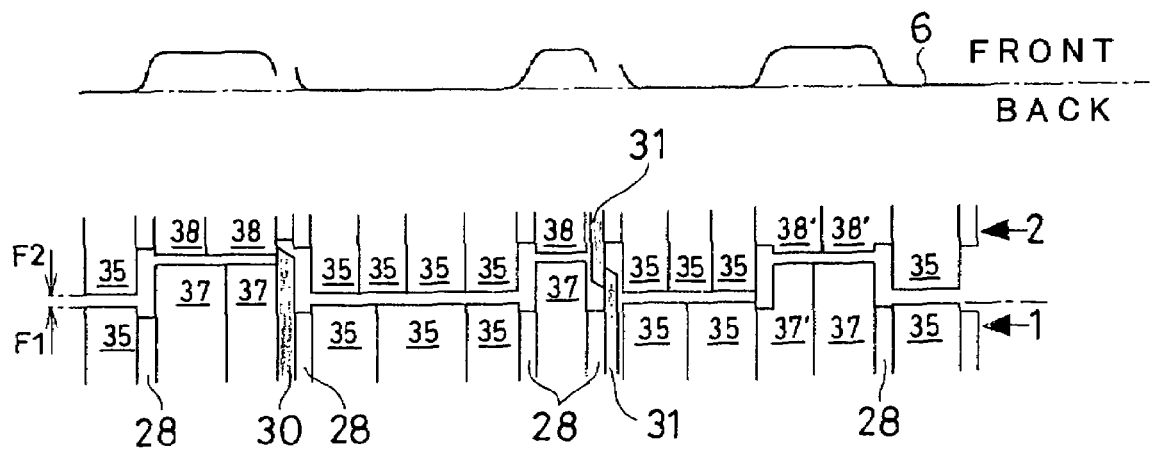
Figure 34:
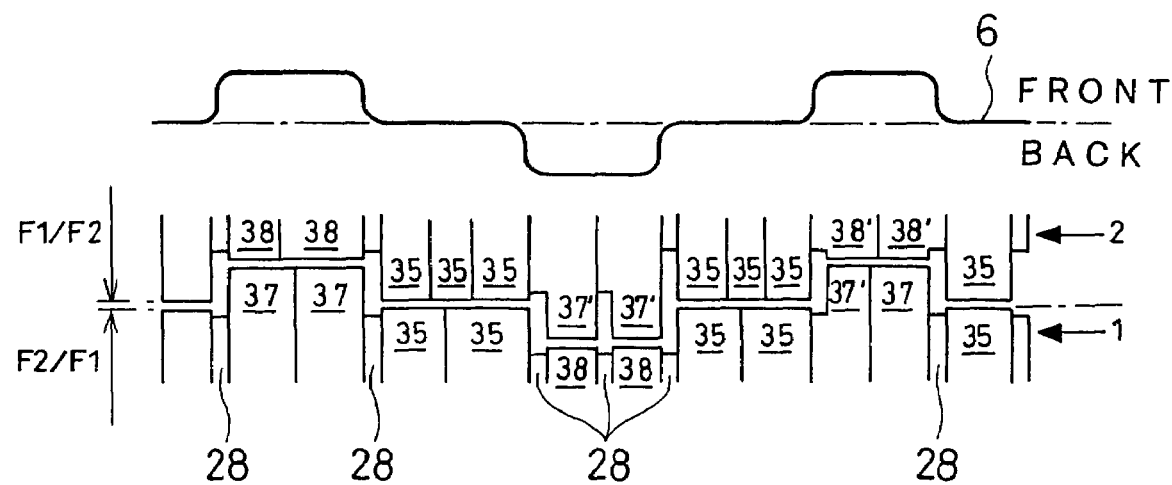
FIG. 34 is a view showing a case in which a circular plate imparted with convexes and a circular plate imparted with concaves, a circular plate which is not provided with concaves/convexes and a spacer are mixed in a single roller.

Further, FIG. 32, FIG. 33 and FIG. 34 show a meshed portion when the two rollers are viewed from the front side. In the drawings, at upper portions thereof, contours of concaves/convexes imparted to the sheet-like object 6 by the rollers are shown. Notations 37' and 38' designate a circular plate imparted with convexes and a circular plate imparted with concaves integrated with spacers.

In FIG. 32, the circular plates imparted with concaves/convexes 20 and the spacers 28 are alternately arranged. In FIG. 33, the spacers 28 are interposed between a single or a plurality of groups of the circular plate imparted with concaves/convexes 20 each laminated to constitute one group. In FIG. 34, there are shown the rollers in which front sides and back sides of faces formed with convexes are inverted at every predetermined section in the width direction of the sheet-like object. A single piece of the roller is provided with the reference face F1 for the convex 20b and the reference face F2 for the concave 20a.

In the first roller 1, the roller surface is constituted by laminating a single or a plurality of sheets of the circular plates 37 having the convexes at the outer peripheries or a single or a plurality of sheets of the circular plates 38 having the concaves at the outer peripheries and the circular plates 35 which are not provided with concaves/convexes and the spacers pertinently provided as necessary.

In the second roller 2, the roller surface is constituted by laminating a single or a plurality of sheets of the circular plates 38 having the concaves at the outer peripheries in correspondence with the convexes of the first roller and a single or a plurality of sheets of the circular plates 37 having the convexes at the outer peripheries in correspondence with the concaves of the first roller 1 and the circular plates 35 which are not provided with concaves/convexes and the spacers pertinently provided as necessary.

Thereby, the front side and the backside of the sheet-like object 6 can alternately be provided with the convexes.

Further, a roller formed with a roller surface by an elastic body capable of responding to the convexes in place of the circular plates imparted with the concaves 38 constituting the second roller 2, for example, rubber or soft urethane can be used. Thereby, the elastic body of the surface of the second roller 2 is concaved to form the concaves in response to the convex of the first roller 1 and therefore, an effect substantially equivalent to an effect of the concave provided from the start is achieved. Therefore, it is necessary that a thickness of the elastic body is a thickness capable of sufficiently achieving the effect of the concave.

Further, a roller formed with a roller surface by a hard material and/or a metal material which is not provided with the concaves can be used in place of the circular plates imparted with concaves 38 constituting the second roller 2. Thereby, while maintaining the one face of the sheet-like object 6 in a plane, the convexes can be imparted only to other face and the working situation becomes a situation similar to imparting press makes only to a work face.

When concaves and convexes are alternately provided to the front face and the back face of the sheet-like object 6, working degrees of the front side and the back side are the same or substantially the same and therefore, the sheet-like object to be fabricated is hardly bent, however, when the convexes are imparted only to one face of the front and back faces of the sheet-like object, the working degrees of the front side and the rear side differ from each other significantly and therefore, the sheet-like object to be fabricated is bent to reduce the commercial value. In that case, it is preferable to provide the above-described bending preventive mechanism.

Further, although the spacer 28 is used in any of the above-described examples of the embodiments, the spacer 28 is pertinently used as necessary. Therefore, there is also a case of not using the spacer 28.

(Thin Metal Plate)

When concaves/convexes are imparted to a thin metal plate, for example, a thin steel plate, a thin aluminum plate, a thin stainless steel plate, a thin titanium plate, or a thin copper plate, although depending on the kind of metal, in the case of a thickness to a degree of being used ordinarily, for example, about 0.1 mm in a thin stainless steel plate, about 0.4 mm in a thin aluminum plate, concaves/convexes can be fabricated by the apparatus of imparting concaves/convexes according to the invention.

A thin metal plate imparted with concaves/convexes can develop a use as an ornamental use by changing luster performance thereof. Otherwise, the thin metal plate can be used in the following wide use.

The metal plate can be used as a structural material by itself by an effect of promoting bending rigidity owing to fabrication of concaves/convexes. Or, the thin metal plate can be used as a backing material pasted with other material, for example, a construction material and an industrial material pasted with an acoustic material, a heat insulating material or a heat reserving material. Further, the thin metal plate can be used as a composite construction material compounded with other material, for example, sponge, foamed urethane or the like of rubber or the like. Further, the thin metal plate can effectively used as a material of a reflecting plate of sound or light, a construction material or an industrial material since random reflecting performance of sound and light is promoted. Further, the thin metal plate can be utilized also as a heat radiating material since a surface area thereof is increased and a disturbant flow of a heat medium is promoted.

(Metal Mesh)

When concaves/convexes are provided to a metal mesh having a material of an metal wire, for example, a steel wire, an aluminum wire, a stainless steel wire, a copper wire or the like, in view of the characteristic of the metal mesh, concaves/convexes can be fabricated by labor and power smaller than those of the thin metal plate.

However, when concaves/convexes are imparted to the metal mesh, a large one of the convex 20b is used. The metal mesh imparted with concaves/convexes becomes further suitable as a material of a filter having rigidity and porousity owing to an increase in the surface area, an increase in rigidity and concaves/convexes performance of the metal mesh per se, further, use of the metal mesh as a construction material or a structural material, for example, use as an acoustic material, a heat insulating material or a heat reserving material is further developed.

(Corrugated Board)

When concaves/convexes are imparted to a corrugated board, although a large amount of concave/convex of the convex 20b is needed since the corrugated board is interposed with core sheet, concaves/convexes can be fabricated by small labor and power.

The corrugated board is used in many fields as a packing box, meanwhile, the corrugated board is provided with a difficulty that the corrugated board is difficult to abandon in comparison with an ordinary paper product since the corrugated board is bulky and an amount thereof in abandoning is difficult to reduce owing to a property of high rigidity and porousity of the corrugated board per se.

However, the material per se of the corrugated board is easy to reproduce for other use because the material is more fibrous than gravure sheet or the like. Particularly, when a fertilizer is produced by utilizing a waste at hand of fallen leaves, household waste or the like, the corrugated board fabricated with concaves/convexes is provided with suitable permeability, transmittivity and water holding property depending on large or small or depth of concaves/convexes and an aperture rate of convex or the like and therefore, an effect of promoting to form a fertilizer from a waste of fallen leaves, household waste or the like is achieved, further, blocked formation of the fertilizer is facilitated owing to planability, rigidity and integrity of the corrugated board and therefore, various effects of capable of promoting performance of handling the fertilizer and the like are achieved.

Therefore, positively using the corrugated board imparted with concaves/convexes as a material for producing a fertilizer is effective in processing the corrugated board which is bulky and regarded as a nuisance and significantly contributes to conserve the global environment.

Further, by using the corrugated as a central core material of FRP (Fiber Reinforced Plastic) by utilizing an effect of a complicated surface caused by the porosity and fabrication of concaves/convexes of the corrugated board, an inexpensive product reducing an amount of using FRP in an FRP product can be produced.

(Synthetic Resin)

When a synthetic resin plate is produced with synthetic resin as a raw material, there is a case in which the raw material cannot be supplied by supplying the raw material to a smooth roller and it is difficult to produce the synthetic resin plate.

In such a case, when the raw material is passed through an apparatus for imparting concaves/convexes, the raw material can precisely be supplied by concaves/convexes of the roller and a semifinished product having concaves/convexes preferable to steps of producing a smooth synthetic resin plate at successive steps can be supplied. Further, a finished product of a synthetic resin plate having concaves/convexes can also be produced by finishing a producing step by the step.

When a thermosetting or thermoplastic nonwoven fabric including thermosetting or thermoplastic fiber and/or a thermosetting or thermoplastic adhering material is imparted with concaves/convexes by an apparatus for imparting concaves/convexes having a mechanism of heating the roller, the nonwoven fabric manifests a thermosetting or thermoplastic property as a whole, the concaves and the convexes are difficult to wear and therefore, when the nonwoven fabric is used as an underlay of a food product or the like, draining performance is improved and a property of preserving food is promoted and polishing performance is promoted as a polishing material, further, the nonwoven fabric can be used by a larger number of times.

When a synthetic resin film, a synthetic resin sheet or a synthetic resin plate having a thermosetting or thermoplastic property is imparted with concaves/convexes by the apparatus for imparting concaves/convexes having the mechanism of heating the roller, concaves/convexes having smooth surfaces which are not provided with notches produced in fabricating concaves/convexes can be formed, further, in the case of a synthetic resin plate, cracks which are liable to be brought about can be prevented from occurring and therefore, a use therefor similar to that of the thin metal plate can be developed.

(Effect)

The invention is embodied in the mode explained above and achieves a significant effect described below.

When the spacer is provided, the tolerance of the thickness of the circular plate, or influence of work strain of spring back, burr, warp or the like brought about in steps of fabricating concaves/convexes, for example, in punching or in laser machining can simply be processed. For example, barreling for removing spring back brought about in punching is dispensed with.

As a shape of the spacer, it is not necessary to provide a mechanism of preventing idling such as the projection provided at the inner diameter portion of the circular plate imparted with concaves/convexes, a simple structure in a ring-like shape can be adopted and therefore, a spacer which is facilitated in fabrication thereof and inexpensive can be adopted.

Further, when spacers having such a shape and spacers of several kinds having different thicknesses are used, it is extremely facilitated to constitute the same thickness by a block of a plurality of sheets of circular plates imparted with concaves/convexes and by laminating further blocks of pluralities of sheets of circular plates imparted with concaves/convexes which are blocked in this way, a long roller having excellent positional accuracies of concaves/convexes can simply be integrated.

Further, by making the outer diameter of the spacer smaller than the diameter of the circle constituting the bottom of the concave of the circular plate imparted with concaves/convexes, the spacer can be prevented from being influenced by work strain of portions of concaves/convexes, for example, spring back in punching or melding by shearing in laser machining.

Owing to the above-described various effects, it is not necessary to fabricate and adjust a circular plate imparted with concaves/convexes per se having a complicated shape in order to prevent a failure in mesh or the like and the apparatus can be provided inexpensively. A light-weighted spacer can be adopted in place thereof and therefore, light-weighted formation and inexpensive formation of a total of the apparatus can be achieved.

Further, when a circular plate and a spacer are integrated by providing a thickness of the spacer to the circular plate imparted with concaves/convexes or the like, a further inexpensive roller can be fabricated.

By only changing a distance between circular plates imparted with concaves/convexes by thickening a thickness of a spacer per se or laminating a plurality of spacers each having a predetermined thickness, a pattern of concaves/convexes provided to a sheet-like object can be made to differ. It is not necessary to further fabricate for adjust concaves/convexes of the circular plate imparted with concaves/convexes and therefore, various patterns can be provided to the sheet-like object further inexpensively.

Further, when a side portion of a convex of the first roller 1 and a side portion of a convex of the second roller 2 are brought into a contiguous relationship, a shearing effect (effect of scissors) can be operated to a sheet-like object between the convexes of the two rollers. Owing to the effect, when the shearing effect is strongly operated by reducing the thickness of the spacer or by not using the spacer, the sheet-like object can be perforated at the portion. Thereby, a sheet-like object of paper can be provided with a higher adsorbing function and use of sheet for adsorbing oils can further be widened.

Although there is a case in which a thin sheet-like object is coiled around the roller after fabricating concaves/convexes, by providing a plurality of needle-like rods for preventing coiling at the spacer portion, coiling of the sheet-like object can firmly be prevented without hampering rotation of the roller.

Further, in the case of a material having a vacant core as in a material of corrugated board, it is not necessarily needed to bring concaves/convexes of the two rollers in mesh with each other and by simply providing an open hole at the convex, adsorbing performance can be promoted.

Furthermore, by mixing a single or a plurality of sheets of circular plates imparted with concaves/convexes and a single or a plurality of sheets of spacers, or by using a circular plate having a shape of concaves/convexes synthesized with two or more kinds of patterns of concaves/convexes, or by mixing circular plates having quite different shape of concaves/convexes, various patterns having complicated beautiful outlooks can be produced. As a result, the aesthetic value of a paper sheet fabricated with concaves/convexes can be promoted.

Further, by using a circular plate having a shape of concaves/convexes synthesized with two or more kinds of patterns of concaves/convexes, various effects shown below are achieved.

A first effect resides in that an excellent shock absorbing material having a different hardness of cushioning performance can be fabricated by large or small of concaves/convexes concaves/convexes having different shape since the cushioning performance differ by large or small or shape of concaves/convexes.

A second effect resides in that concaves/convexes can be imparted by laminating a plurality of sheets of materials by adopting one kind of large concaves/convexes in two or more kinds of concaves/convexes, as a result, an object fabricated with concaves/convexes in which the plurality of sheets thereof are integrated and cannot be separated from each other easily can be fabricated. According to the second effect, by using a sheet printed with items with regard to a commercial product of commercial name, place of production, trade mark and the like for one sheet of a surface of a fabricated paper sheet laminated with the plurality of sheets, a package buffer material promoting a commercial value of the commercial product can inexpensively be fabricated.

A third effect resides in that by adopting large concaves/convexes in one kind of two or more kinds of concaves/convexes, a package material having a flexibility more excellent than that of a package material having only one kind of concaves/convexes can be provided and in addition to the first effect, as a package material having excellent cushioning performance, vegetables and fruits, heavy and small-sized machine parts and the like can inexpensively be packaged piece by piece.

A fourth effect resides in being capable of promoting convexes and concaves fabricating performance such that a flat portion of an object fabricated with concaves/convexes is further reduced, a surface area thereof is further increased, or a filler constituting paper, for example, calcium carbonate or pigment is further crushed by adopting large and small different concaves/convexes. By the effect, used paper which has been abandoned as waste by being cut by a slitter or the like conventionally since it is difficult to read characters printed on a paper sheet fabricated with concaves/convexes can be reused as a useful package buffer material, further, used paper or the like can be used as an adsorbing paper sheet having further excellent adsorbing property since the adsorbing property can be promoted, further, fibers of used paper are facilitated to reuse since a property of separating fibers constituting paper in water (water disaggregating property) is improved.

In addition thereto, by thinning a predetermined portion of concaves/convexes of a circular plate imparted with concaves/convexes, or making predetermined concaves/convexes of a predetermined portion in concaves/convexes of a circular plate by concaves/convexes different from the concaves/convexes at other than the portion, a function of producing a predetermined pattern of the portion can be provided and therefore, by attaching a pattern or trade mark which is original for a commercial product, commercial value of a package product can be promoted.

As a result of making a certain number of interval keeping mechanism of spacers or the like serve also as shearing mechanism, an object fabricated with concaves/convexes having a regular width can be fabricated and a packaging material matched to a size of a packaged object and a packaging buffer material of underlay, middle-lay, overlay or the like suitable for a size of a packaging box can be supplied. Further, by providing the interval keeping mechanism with a mechanism of partially cutting in a circumferential direction, a portion of an object to be fabricated can positively be cut and therefore, cushioning performance is promoted and a convenience of cutting in use can be achieved.

Further, when concaves/convexes are small and a number of concaves/convexes is large, a single piece of roller of two pieces of rollers can be formed with a roller surface by an elastic body capable of responding to a convex of the roller having concaves/convexes, for example, rubber or urethane and therefore, a reduction in fabricating cost can be achieved.

Further, according to the invention, a roller surface is formed by laminating a number of circular plates imparted with concaves/convexes and therefore, concaves/convexes synthesized with two or more kinds of patterns of concaves/convexes are attached to a pair of concaves/convexes of a circular plate imparted with concaves/convexes, all of concaves/convexes of a circular plate imparted with concaves/convexes are made to differ from each other, a predetermined portion of concaves/convexes is thinned, only predetermined concaves/convexes at a predetermined portion are attached with concaves/convexes different from other thereof for respective sheets of circular plates and therefore, a roller having a function of producing a predetermined pattern can extremely easily be fabricated.

Further, it is also easy to integrate a circular plate having a shear from the similar reason. Further, it is extremely easy to mixedly use circular plates imparted with concaves/convexes which are different from each other and integrate the circular plates to a roller shaft.

Further, the apparatus for imparting concaves/convexes according to the invention is driven to rotate by a structure in which a first roller rotatably fixed is pressed with a second roller opposed thereto by self weight or pressing mechanism to thereby bring a convex of the first roller and a concave of the second roller in mesh with each other and therefore, an apparatus which is difficult to be failed and inexpensive can be supplied.

Further, an object fabricated with concaves/convexes having a high planarity can be provided by providing a mechanism of preventing a sheet-like object as fabricated from being bent.

Furthermore, by heating an object to be fabricated with concaves/convexes in imparting concaves/convexes from a roller temperature of which is controlled, thermal deformation of a resin sheet having a thermally deforming property is promoted, even the resin sheet which is provided with poor forming performance but excellent thermally deforming property is made to be able to sufficiently fabricate concaves/convexes and concaves/convexes fabricating performance of a food material fabricating performance of which is improved by being heated at suitable temperature, for example, a sagittated calamary can be promoted to produce a food easy to eat.

Although conventionally, there is not found a product which intends to positively utilize an effect particular to concaves/convexes provided to a thin metal plate, metal mesh, or corrugated board by providing concaves/convexes to the thin metal plate, the metal mesh or the corrugated board, when an effect particular to concaves and convexes produced by providing concaves/convexes of a shape suitable for properties provided by the materials and modes of utilizing the respective materials as described above, in the case of the thin metal plate, the metal mesh, the corrugated board or the synthetic resin plate, a use mainly useful for a construction material, or an industrial material is widened, further, in the case of the corrugated board, the corrugated board can effectively be utilized as a material or the like for producing a fertilizer and contributes significantly to conserving the global environment.

Further, when it is difficult to produce a synthetic resin plate since a raw material of synthetic resin cannot pertinently be supplied, by passing the raw material through an apparatus for imparting concaves/convexes for imparting concaves/convexes by a roller, the raw material can precisely be supplied by concaves/convexes of the roller and a semifinished product having concaves/convexes preferable for steps of producing a smooth synthetic resin plate at successive steps can be supplied.

Further, a particular effect by which concaves/convexes are difficult to wear is provided to a nonwoven fabric imparted with concaves/convexes by an apparatus for imparting concaves/convexes having a heated roller and a use of product as an underlay of a food or the like, polishing material or the like can be provided.

When concaves/convexes are imparted to a synthetic resin film, a synthetic resin paper sheet or a synthetic resin plate having a thermosetting or thermoplastic property by an apparatus for imparting concaves/convexes having a heated roller, a product which is not provided with notches in fabricating concaves/convexes and is provided with a surface having smooth concaves/convexes can be produced and a useful use similar to that of the thin metal plate can be provided.

According to the invention of the application, when a roller is constituted by a number of laminated circular plates, the circular plates are backed up by a backup roller by utilizing circular plates which are not provided with a function of imparting concaves/convexes to an object to be fabricated and are not provided with concaves/convexes and therefore, a function of imparting concaves/convexes of an apparatus of imparting concaves/convexes is not deteriorated.

Further, by providing a sliding preventive mechanism to circular plates provided for backup, the circular plates are prevented from sliding to each other and therefore, load to be backed up in rotating the roller can be backed up always firmly. Furthermore, the sliding preventive mechanism provided to the circular plate provided for backup is fabricated by simple fabrication to the circular plate having a thin plate thickness different from an ordinary roller and therefore, a reduction in price of the apparatus can be achieved.

Further, the backup can be carried out concentrically by the circular plate for backup and therefore, a backup roller having a short length and a small diameter can be used. As a result thereof even a hard object to be fabricated having a wide width which needs large pressing load can be fabricated with the same concaves/convexes over an entire width of the object to be fabricated and an inexpensive apparatus can be provided without making an apparatus of imparting concaves/convexes large-sized.

In the case of apparatus for imparting concaves/convexes having a roller constituted by a circular plate or the like having a convex at an outer periphery thereof and a roller constituted by a circular plate or the like having a concave at an outer periphery thereof, a convex can be imparted at one face of front and rear faces to bring about the following effect.

Firstly, a range of being capable of being used as an ornamental material is widened since there is not a hindrance in adhering to a plane. Secondly, a storage area is reduced since the product is not bulky in storing the product by laminating the product. Thirdly, a packaging material for packaging a product having a high commercial value at a surface thereof, is requested to provide cushioning performance between the product and other product while protecting the surface, the request can be met by wrapping the product by a face which is not provided with the convex.

Since the roller surface is constituted by outer peripheral portions of a number of laminated circular plates, a convex pattern may be provided to an outer periphery of a predetermined circular plate, a sculpture over an entire face of the roller surface as in a conventional roller is not needed and an inexpensive apparatus can be provided. Particularly, the circular plate can constitute a part and can be mass-produced and therefore, a further reduction in cost can be achieved.

Further, by constituting the roller surface by making a block by every plurality of sheets of circular plates having convexes at outer peripheries thereof and making a block by every plurality of sheets of circular plates having concaves at outer peripheries thereof to bring the blocks in mesh with each other at one roller and other roller, convexes can be imparted alternately to front and back faces of a sheet-like object by a predetermined width while reducing bending and a number of objects fabricated with convexes each having a comparatively narrow can simultaneously be fabricated.

Further, when a roller constituted by a circular plate having a concave at an outer periphery thereof is formed with a roller surface by an elastic body capable of responding to a convex of a roller having a convex, for example, rubber or urethane, a reduction in fabricating cost can be achieved. Particularly, the constitution is useful when the convex is small and a number of the convexes is large.

Similar to the above-described, by using a roller formed with a roller surface by a hard material or a metal material which is not provided with a concave in place of a circular plate imparted with concaves, while maintaining one face of a sheet-like object in a plane, convexes can be imparted to only other face thereof, a working situation thereof becomes a situation similar to that in imparting press marks to only a working face, while maintaining waterproof on the side of the plane, a rate of catching steam, moisture or the like is promoted on the side of the press marks and therefore, a useful overlay or packaging paper sheet for a food or the like can be provided.

Further, in the case of a material having a vacant core as in a material for corrugated board, it is not necessarily needed to bring a concave and a convex in mesh with each other and adsorbing performance can be promoted by simply providing an open hole by the convex.

Further, conventionally, it has been difficult to fabricate a roller which is provided with deep concaves/convexes and a long length in a roller provided with a surface of concaves/convexes by machining or hollowing a single piece of a round bar. However, according to a roller imparted with concaves/convexes in an apparatus for imparting concaves/convexes of the invention, a surface of the roller for imparting concaves/convexes is formed by laminating a single or a plurality of the circular plates fabricated with concaves/convexes and therefore, the roller for imparting concaves/convexes which is provided with deep concaves/convexes and a long length can easily be fabricated.

Further, when deep concaves/convexes are intended to impart to a sheet-like object by a conventional press apparatus, the press apparatus tends to be large-scaled. However, according to the invention, the sheet-like object can be imparted with deep concaves/convexes without enlarging the apparatus comparatively.

INDUSTRIAL APPLICABILITY

The invention is most preferable as an apparatus for imparting concaves/convexes capable of imparting concaves/convexes simply to a sheet-like object and having a simple constitution. The sheet-like object can be a thin metal plate, a metal mesh, a corrugated board, a synthetic resin plate, a nonwoven fabric, a synthetic resin film or a synthetic resin paper sheet.

The invention claimed is:

1. An apparatus for imparting concaves/convexes to a sheet-like object, comprising:
   a pair of rollers that are axially parallel and radially opposite to each other, said pair of rollers including a first roller and a second roller;
   each roller including axially adjacent and circumferentially extending contours, each contour defined by circumferentially alternating convex and concave surfaces, said contours disposed so that a peak of a convex surface on said first roller radially opposes a trough of a concave surface on said sceond roller;
   at least two axially adjacent contours on at least one roller are distanced by a predetermined axial segment, wherein an outermost diameter of said axial segment is constant and either smaller than a trough of an axially adjacent concave surface or larger than a peak of an axially adjacent convex surface;
   said sheet like object being passed between said pair of rollers facing each other and being thereby imparted with concaves/convexes;
   wherein at least one of the rollers is a roller formed with a roller surface by laminating a number of circular plates each provided with concaves/convexes at an outer periphery thereof; and
   wherein a shape of concaves/convexes of the circular plate the outer periphery of which is provided with concaves/convexes is a shape of concaves/convexes formed by synthesizing two kinds or more of patterns of concave/convexes.

2. An apparatus for imparting concaves/convexes to a sheet-like object, comprising:
   a pair of rollers that are axially parallel and radially opposite to each other, said pair of rollers including a first roller and a second roller;
   each roller including axially adjacent and circumferentially extending contours, each contour defined by circumferentially alternating convex and concave surfaces, said contours disposed so that a peak of a convex surface on said first roller radially opposes a trough of a concave surface on said second roller;
   at least two axially adjacent contours on at least one roller are distanced by a predetermined axial segment, wherein an outermost diameter of said axial segment is constant and either smaller than a trough of an axially adjacent concave surface or larger than a peak of an axially adjacent convex surface;
   said sheet like object being passed between said pair of rollers facing each other and being thereby imparted with conaves/convexes;
   wherein at least one of the rollers is a roller formed with a roller surface by laminating a number of circular plates each provided with concaves/convexes at an outer periphery thereof; and
   wherein all of concaves/convexes of the circular plate provided with concaves/convexes at the outer periphery are constituted by different conaves/convexes.

3. An apparatus for imparting concaves/convexes to a sheet-like object, comprising:
   a pair of rollers that are axially parallel and radially opposite to each other, said pair of rollers including a first roller and a second roller;
   each roller including axially adjacent and circumferentially extending contours, each contour defined by circumferentially alternating convex and concave surfaces, said contours disposed so that a peak of a convex surface on said first roller radially opposes a trough of a concave surface on said second roller;
   at least two axially adjacent contours on at least one roller are distanced by a predetermined axial segment, wherein an outermost diameter of said axial segment is constant and either smaller than a trough of an axially adjacent concave surface or larger than a peak of an axially adjacent convex surface;
   said sheet like object being passed between said pair of rollers facing each other and being thereby imparted with concaves/convexes;
   wherein at least one of the rollers is a roller formed with a roller surface by laminating a number of circular plates each provided with concaves/convexes at the outer periphery; and
   wherein at least one of the rollers is constituted by a number of the circular plates having different shapes of concaves/convexes.

4. An apparatus for imparting concaves/convexes to a sheet-like object, comprising:
   a pair of rollers that are axially parallel and radially opposite to each other, said pair of rollers including a first roller and a second roller;
   each roller including axially adjacent and circumferentially extending contours, each contour defined by circumferentially alternating convex and concave surfaces, said contours disposed so that a peak of a convex surface on said first roller radially opposes a trough of a concave surface on said second roller;
   at least two axially adjacent contours on at least one roller are distanced by a predetermined axial segment, wherein an outermost diameter of said axial segment is constant and either smaller than a trough of an axially adjacent concave surface or larger than a peak of an axially adjacent convex surface;
   said sheet like object being passed between said pair of rollers facing each other and being thereby imparted with concaves/convexes;
   wherein at least one of the rollers is a roller formed with a roller surface by laminating a number of circular plates each provided with concaves/convexes at an outer periphery thereof; and
   wherein by thinning a predetermined portion of concaves/convexes of the circular plate provided with concaves/convexes at the outer periphery or by constituting predetermined concaves/convexes of the predetermined portion in concaves/convexes of the circular plate by concaves/convexes different from the concaves/convexes of other than the portion, a predetermined pattern is produced at the portion.

5. An apparatus for imparting concaves/convexes to a sheet-like object by passing the sheet-like object between a pair of rollers facing each other:
wherein at least one of the rollers is a roller formed with a roller surface by laminating circular plates each provided with concaves/convexes at an outer periphery thereof;
wherein at least one of the rollers includes a fixing mechanism for enabling the plurality of circular plates each provided with concaves/convexes at the outer periphery to fix to one roller shaft while shifting a pitch of the concaves/convexes; and
at least two axially adjacent plates on at least one roller being distanced by a separation plate having an outermost diameter that is constant and either smaller than a trough of an axially adjacent concave surface of said concaves/convexes or larger than a peak of an axially adjacent convex surface of said concaves/convexes.

6. An apparatus for imparting concaves/convexes to a sheet-like object by passing the sheet-like object between a pair of rollers facing each other:
wherein at least one of the rollers is a roller formed with a roller surface by laminating a number of circular plates each provided with concaves/convexes at an outer periphery thereof, further comprising:
a mechanism for hearing said at least one roller, a temperature detecting mechanism and a temperature control apparatus; and
at least two axially adjacent glares on at least one roller being distanced by a separation plate having an outermost diameter of that is constant and either smaller than a trough of an axially adjacent concave surface of said concaves/convexes or larger than a peak of an axially adjacent convex surface of said concaves/convexes.

7. The apparatus of claim 5, further comprising a backup mechanism for backing up the circular plate provided with concaves/convexes constituting said at least one roller.

8. The apparatus of claim 5, further comprising either or both of a circular plate which is not provided with concaves/convexes and an interval keeping mechanism at said at least one roller and further comprising a backup mechanism for backing up either or both of the circular plate which is not provided with concaves/convexes and the interval keeping mechanism.

9. The apparatus for imparting concaves/convexes according to claim 8, wherein the backup mechanism includes a backup roller having a backup circular plate which is not provided with concaves/convexes for backing up either or both of the circular plate which is not provided with conaves/convexes and the interval keeping mechanism, further comprising a sliding preventive mechanism at outer peripheries of a certain number of at least a group constituted of the circular plate which is not provided with concaves/convexes, the interval keeping mechanism and the backup circular plate.

10. The apparatus of claim 5, wherein one of the rollers includes a circular plate having a convex at an outer periphery thereof and other of the rollers includes a circular plate having a concave in correspondence with the convex at an outer periphery thereof to provide a convex at one face of front and rear faces of the sheet-like object.

11. The apparatus of claim 5, wherein the roller surface of one of the rollers is constituted by an alternately laminated plurality of sheets of circular plates each having a convex at the outer periphery and a plurality of sheets of circular plates each having a concave at the outer periphery and the roller surface of other of the rollers is constituted by an alternately laminated plurality of sheets of circular plates each having a concave in correspondence with the convex of the one of rollers at the outer periphery and a plurality of sheets of circular plates each having a convex in correspondence with the concave of the one of rollers at the outer periphery to impart convexes alternately to front and rear faces of the sheet-like object.

12. The apparatus of claim 5, wherein an axial portion of the pair of rollers is not provided with conaves/convexes.

13. The apparatus for imparting concaves/convexes according to claim 5, further including a plurality y of said separation plates and each circular plate provided with concaves/convexes is separated from each adjacent circular plate provided with concaves/convexes by one of said separation plates.

14. The apparatus for imparting concaves/convexes according to claim 5, further including a plurality of said separation plates and said at least one roller is constituted by mixing a single or a plurality of sheets of the circular plates each provided with concaves/convexes at the outer periphery and a single or a plurality of sheets of the separation plates.

15. The apparatus for imparting concaves/convexes according to claim 5, further including a plurality of said separation plates, each circular plate provided with concaves/convexes is separated from each adjacent circular plate provided with concaves/convexes by, and integral with, one of said separation plates.

16. The apparatus for imparting concaves/convexes according to claim 13, wherein a predetermined number of the separation plates comprise interval keeping mechanisms which serve also as cutting mechanisms; and
the cutting mechanisms having a larger outer diameter than the outer circumference of each roller.

17. The apparatus for imparting concaves/convexes according to claim 16, wherein the interval keeping mechanism having the cutting mechanism over an entire periphery thereof and/or the interval keeping mechanism having the cutting mechanism at a predetermined portion of a circumference thereof constitute a predetermined number of the interval keeping mechanisms; and
the cutting mechanisms having a larger outer diameter than the outer circumference of each roller.

18. The apparatus of claim 5, wherein a convex of one of the rollers and a concave of the roller opposed thereto are brought in mesh with each other by pressing the opposed roller to one of the rollers fixed rotatably by a self weight thereof and/or a pressing mechanism.

19. The apparatus of claim 5, further comprising a mechanism for preventing the sheet-like object as fabricated from being bent.

* * * * *